US009860870B2

(12) United States Patent
Sundberg et al.

(10) Patent No.: US 9,860,870 B2
(45) Date of Patent: Jan. 2, 2018

(54) WIRELESS COMMUNICATIONS-DYNAMIC COVERAGE CLASS UPDATE AND ALIGNING COVERAGE CLASS PAGING GROUPS

(71) Applicant: TELEFONAKTIEBOLAGET LM ERICSSON (PUBL), Stockholm (SE)

(72) Inventors: Mårten Sundberg, Årsta (SE); Nicklas Johansson, Brokind (SE); Paul Schliwa-Bertling, Ljungsbro (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/973,586

(22) Filed: Dec. 17, 2015

(65) Prior Publication Data
US 2016/0219553 A1 Jul. 28, 2016

Related U.S. Application Data

(60) Provisional application No. 62/107,847, filed on Jan. 26, 2015.

(51) Int. Cl.
*G01R 31/08* (2006.01)
*H04W 68/02* (2009.01)
(Continued)

(52) U.S. Cl.
CPC ........... *H04W 68/02* (2013.01); *H04L 1/0009* (2013.01); *H04L 1/0013* (2013.01); *H04W 8/18* (2013.01); *H04W 76/048* (2013.01); *H04L 1/08* (2013.01)

(58) Field of Classification Search
CPC ..... H04W 68/02; H04W 76/048; H04W 8/18; H04L 1/0009; H04L 1/0013; H04L 1/08
See application file for complete search history.

(56) References Cited

U.S. PATENT DOCUMENTS 8,503,308 B1  8/2013  Oroskar et al.
8,893,009 B2  11/2014  Raleigh et al.
(Continued)

FOREIGN PATENT DOCUMENTS

EP  2 161 951 A1  3/2010

OTHER PUBLICATIONS

3rd Generation Partnership Project; Technical Specification Group Radio Access Network; Evolved Universal Terrestrial Radio Access Network (E-UTRS); LTE coverage enhancements (Release 11). 3GPP TR 36.824 v11.0.0 (Jun. 2012), the whole document, dated 2012 pp. 1-18.

(Continued)

*Primary Examiner* — Robert Wilson

(57) ABSTRACT

Techniques are described herein that enhance the following: (1) how a wireless device conveys a change of its downlink (DL) coverage class (CC) to a network; and (2) how the network and the wireless device each perform a new paging group procedure to align coverage class paging groups within a given Extended Discontinuous Receive (eDRX) cycle for the wireless device. In addition, devices namely a wireless device, a radio access network node (e.g., Base Station Subsystem), and a core network node (e.g., Serving GPRS Support Node) that implement these techniques are described herein.

22 Claims, 8 Drawing Sheets

(51) Int. Cl.
*H04W 8/18* (2009.01)
*H04W 76/04* (2009.01)
*H04L 1/00* (2006.01)
*H04L 1/08* (2006.01)

(56) References Cited

U.S. PATENT DOCUMENTS

| | | | |
|---|---|---|---|
| 2005/0003822 A1 | 1/2005 | Aholainen et al. | |
| 2010/0027467 A1 | 2/2010 | Wu et al. | |
| 2010/0091920 A1* | 4/2010 | Alexander | H04L 1/0045 375/350 |
| 2010/0323707 A1 | 12/2010 | Huschke et al. | |
| 2011/0021153 A1* | 1/2011 | Safavi | H04B 7/0434 455/63.1 |
| 2011/0176507 A1 | 7/2011 | Yuk et al. | |
| 2014/0003348 A1 | 1/2014 | Velev et al. | |
| 2014/0064215 A1 | 3/2014 | Wu | |
| 2014/0086188 A1 | 3/2014 | Hoymann et al. | |
| 2014/0098761 A1 | 4/2014 | Lee et al. | |
| 2014/0334372 A1 | 11/2014 | Vos | |
| 2015/0195069 A1 | 7/2015 | Yi et al. | |
| 2015/0373683 A1* | 12/2015 | Schliwa-Bertling | H04W 72/0406 370/329 |
| 2015/0382294 A1* | 12/2015 | Schliwa-Bertling | H04W 52/0229 370/311 |
| 2016/0007406 A1 | 1/2016 | Yi et al. | |
| 2016/0037540 A1* | 2/2016 | Johansson | H04W 74/006 370/329 |
| 2016/0073395 A1* | 3/2016 | Liberg | H04L 69/161 370/329 |
| 2016/0105926 A1* | 4/2016 | Diachina | H04J 3/1694 370/329 |
| 2016/0157251 A1* | 6/2016 | Schliwa-Bertling | H04W 4/005 370/315 |
| 2016/0211986 A1* | 7/2016 | Diachina | H04L 12/4035 |
| 2016/0219553 A1* | 7/2016 | Sundberg | H04L 1/0009 |
| 2016/0219564 A1* | 7/2016 | Bergqvist | H04W 72/0406 |
| 2016/0262130 A1* | 9/2016 | Johansson | H04L 41/0672 |
| 2016/0309449 A1* | 10/2016 | Diachina | H04W 68/02 |
| 2016/0337417 A1* | 11/2016 | Pudney | H04L 65/4061 |
| 2016/0345293 A1* | 11/2016 | Diachina | H04W 68/02 |
| 2016/0345380 A1* | 11/2016 | Diachina | H04W 76/048 |
| 2016/0366669 A1* | 12/2016 | Yum | H04W 72/042 |
| 2017/0064743 A1* | 3/2017 | Lei | H04W 74/0833 |

OTHER PUBLICATIONS

Vodafone Group PLC: "New Study Item on Cellular System Support for Ultra Low Complexity and Low Throughput Internet of Things". 3GPP TSG-GERAN Meeting #62. GP-140421 (rev of GP-140418 rev of GP-140411). Valencia, Spain. Valencia, Spain, May 26-30, 2014), the whole document, pp. 1-6.

Ericsson: "GSM Evolution for cellular IoT—PCH Overview". 3GPP TSG GERAN#63. Tdoc GP-140605. Ljubljana, Slovenia. Aug. 25-29, 2014, the whole document, pp. 1-6.

3rd Generation Partnership Project; Technical Specification Group Core Network and Terminals; Mobile Station—Serving GPRS Support Node (MS-SGSN); Logical Link Control (LLC) layer specification (Release 3GPP TS 44.064 v.12.0.0 (Sep. 2014), the whole document, dated 2014 pp. 1-64.

$3^{rd}$ Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 12). 3GPP TS 48.018 v12.4.0 (Nov. 2014), the whole document, dated 2014 pp. 1-191.

Ericsson: "Supporting Extended DRX for uPoD". 3GPP TSG GERAN#64. Tdoc GP-140894. San Francisco, USA. Nov. 17-21, 2014, the whole document, pp. 1-3.

Ericsson: "Realizing Extended DRX for uPoD". 3GPP TSG GERAN#64. Tdoc GP-140895. San Francisco, USA. Nov. 17-21, 2014, the whole document, pp. 1-3.

Alcatel-Lucent et al.: "Configurable repetition level for PBCH", R1-132055, 3GPP TSG-RAN WG1 Meeting #73, Fukuoka, Japan, May 20-24, 2013, paragraph [0002]; figure 1, pp. 1-3.

Ericsson: "System information for enhanced coverage MTC UE", 3GPP Draft; R1-134647, 3GPP TSG RAN WG1 Meeting #74bis, Guangzhou, China, Oct. 7-11, 2013, paragraph [02.1]—paragraph [02.2], pp. 1-7.

Ericsson: "Accelerated System Access Procedure", 3GPP TSG GERAN #62, Tdoc GP-140365, Valencia, Spain, May 26-30, 2014, the whole document, pp. 1-6.

Vodafone Group PLC.: "Revision of TR on Cellular IoT to include agreements at GERAN#63 and GERAN#64 (V030)". 3GPP TSG GERAN1 adhoc#1& Geran#2 Adhoc#1 on FS_IoT_LC. GPC150009, Sophia-Antipolis, France, Feb. 2-5, 2015, the whole document, pp. 1-2.

Ericsson: "EC-GSM, Support of Normal Bursts in Large Cells". 3GPP TSG GERAN #65. Tdoc GP-150173, Shanghai, China, Mar. 9-13, 2015, the whole document, pp. 1-2.

"Draft Report of TSG GERAN WG1 during TSG GERAN #61, version 0.0.1". Technical Specification Group GERAN WG1 Radio Aspects. Meeting #61. GP-140241, Sophia Antipolis, France, Feb. 25-27, 2014, the whole document, pp. 1-53.

Sony: "Low-cost capability Issues". 3GPP TSG-RAN WG2 Meeting #85. R2-140365. Prague, Czech Republic, Feb. 10-14, 2014, the whole document, pp. 1-4.

Sierra Wireless: "EC-GSM—Device Design Aspects". 3GPP TSG GERAN # 65. Tdoc GP-150060. Shanghai, China, Mar. 9-13, 2015, the whole document, pp. 1-6.

Sigfox Wireless: "C-UNB technology for Cellular IoT—Performance evaluation". 3GPP TSG GERAN #65 meeting. GP150059. Shanghai, PR of China, Mar. 9-12, 2015, the whole document, pp. 1-4.

Ericsson LM: "GSM Evolution for cellular IoT—on using blind repetitions". 3GPP TSG GERAN#64. GP-140882. San Francisco, USA, Nov. 17-21, 2014, the whole document, pp. 1-11.

Ericsson: "EC-GSM, FCCH overview". 3GPP TSG GERAN Ad Hoc#1 on FS_IoT_LC. Tdoc GPC150066, Sophia Antipolis, France, Feb. 2-5, 2015, the whole documeri, pp. 1-8.

Ericsson LM: "EC-GSM—EC-SCH design, performance and mapping". 3GPP TSG GERAN1 Adhoc#1 on FS_IoT_LC. Tdoc GPC150064, Sophia Antipolis, France, Feb. 2-5, 2015, the whole document, pp. 8.

Ericsson: "EC-GSM—Random Access Procedure". 3GPP TSG GERAN Ad Hoc#1 on FS_IoT_LC. Tdoc GPC150074, Sofia Antipolis, France, Feb. 2-5, 2015, the whole document, pp. 1-8.

Ericson: "GSM Evolution for cellular IoT—BCCH Overview". 3GPP TSG GERAN#63. Tdoc GP-140603, Ljubljana, Slovenia, Aug. 25-29, 2014, the whole document.

Ericsson: "EC-GSM—Mapping of logical channels onto physical channels". 3GPP TSG GERAN Ad Hoc#1 on FS_IoT_LC. Tdoc GPC150055, Sofia Antipolis, France, Feb. 2-5, 2015, the whole document, pp. 1-9.

$3^{rd}$ Generation Partnership Project; Technical Specification Group GSM/EDGE Radio Access Network; Cellular System Support for Ultra Low Complexity and Low Throughput Internet of Things (Release 13). 3GPP TR 45.820 v1.3.0 (Jun. 2015), the whole document, pp. 1-270.

* cited by examiner

WIRELESS COMMUNICATIONS-DYNAMIC COVERAGE CLASS UPDATE AND ALIGNING COVERAGE CLASS PAGING GROUPS

CLAIM OF PRIORITY

This application claims the benefit of priority to U.S. Provisional Application No. 62/107,847, filed on Jan. 26, 2015, the entire contents of which are hereby incorporated by reference for all purposes.

TECHNICAL FIELD

The present disclosure relates to the wireless telecommunications field and, more particularly, to techniques for enhancing the following: (1) how a wireless device conveys a change of its downlink (DL) coverage class (CC) to a network; and (2) how the network and the wireless device each perform a new paging group procedure to align coverage class paging groups within a given Extended Discontinuous Receive (eDRX) cycle for the wireless device. In addition, the present disclosure relates to devices namely a wireless device, a radio access network node (e.g., Base Station Subsystem), and a core network node (e.g., Serving GPRS Support Node) that implement these techniques.

BACKGROUND

The following abbreviations and terms are herewith defined, at least some of which are referred to within the following description of the present disclosure.
3GPP 3rd-Generation Partnership Project
ACK Acknowledge
AGCH Access Grant Channel
ARQ Automatic Repeat Request
ASIC Application Specific Integrated Circuit
BLER Block Error Rate
BLKS Blocks
BSC Base Station Controller
BSS Base Station Subsystem
BSSGP Base Station Subsystem GPRS Protocol
BTS Base Transceiver Station
CC Coverage Class
CN Core Network
DL Downlink
DSP Digital Signal Processor
DRX Discontinuous Receive
eDRX Extended Discontinuous Receive
EC-GSM Extended Coverage-Global System for Mobile Communications
EC-PCH Extended Coverage Paging Channel
EC-SCH Extended Coverage Synchronization Channel
EDGE Enhanced Data rates for GSM Evolution
EGPRS Enhanced General Packet Radio Service
E-UTRA Evolved Universal Terrestrial Radio Access
FCCH Frequency Correction Channel
GSM Global System for Mobile Communications
GERAN GSM/EDGE Radio Access Network
GPRS General Packet Radio Service
HARQ Hybrid ARQ
IE Information Element
IMSI International Mobile Subscriber Identity
IoT Internet of Things
IP Internet Protocol
LAN Local Area Network
LL Logical Link
LLGMM Logical Link GPRS Mobility Management
LLC Logical Link Control
LLSMS Logical Link Short Message Service
LTE Long-Term Evolution
MAC Media Access Control
MCS Modulation and Coding Scheme
MFRM Multiframe
MTC Machine Type Communications
NAS Non-Access Stratum
PCH Paging Channel
PDA Personal Digital Assistant
PDTCH Packet Data Traffic Channel
PDU Protocol Data Unit
PLMN Public Land Mobile Network
PSTN Public Switched Telephone Network
RACH Random Access Channel
RAM Random Access Memory
RAN Radio Access Network
RAT Radio Access Technology
RAU Routing Area Update
RBS Radio Base Station
RCC Radio Coverage Category
RLC Radio Link Control
RNC Radio Network Controller
ROM Read-Only Memory
RRC Radio Resource Control
SAPI Service Access Point Identifier
SCH Synchronization Channel
SGSN Serving GPRS Support Node
SMS Short Message Service
TBF Transport Block Format
TDMA Time Division Multiple Access
TLLI Temporary Logical Link Identifier
TOM Tunneling of Messages
TR Technical Report
TS Technical Specification
UE User Equipment
UL Uplink
VoIP Voice over Internet Protocol
WAN Wide Area Network
WCDMA Wideband Code Division Multiple Access
WiMAX Worldwide Interoperability for Microwave Access
WLAN Wireless Local Area Network
Coverage Class: At any point in time a device belongs to a specific uplink/downlink coverage class that corresponds to either the legacy radio interface performance attributes that serve as the reference coverage for legacy cell planning (e.g., a Block Error Rate of 10% after a single radio block transmission on the PDTCH) or a range of degraded radio interface performance attributes compared to the reference coverage (e.g., up to 4 dB lower performance than that of the reference coverage). Coverage class determines the total number of blind repetitions to be used when transmitting/ receiving radio blocks. An uplink/downlink coverage class applicable at any point in time can differ between different logical channels. Upon initiating a system access a device determines the uplink/downlink coverage class applicable to the RACH/AGCH based on estimating the number of blind repetitions of a radio block needed by the BSS receiver/ device receiver to experience a BLER (block error rate) of approximately 10%. The BSS determines the uplink/downlink coverage class to be used by a device on the device's assigned packet channel resources based on estimating the number of blind repetitions of a radio block needed to satisfy a target BLER and considering the number of HARQ retransmissions (of a radio block) that will, on average, result from using that target BLER. Note: a device operating with radio interface performance attributes corresponding to the reference coverage is considered to be in the best coverage class (i.e., coverage class 1) and therefore does not make blind repetitions.

eDRX cycle: eDiscontinuous reception (eDRX) is a process of a wireless device disabling its ability to receive when it does not expect to receive incoming messages and enabling its ability to receive during a period of reachability when it anticipates the possibility of message reception. For eDRX to operate, the network coordinates with the wireless device regarding when instances of reachability are to occur. The wireless device will therefore wake-up and enable message reception only during pre-scheduled periods of reachability. This process reduces the power consumption which extends the battery life of the wireless device and is sometimes called sleep mode.

Extended Coverage: The general principle of extended coverage is that of using blind repetitions for the control channels and for the data channels. In addition, for the data channels the use of blind repetitions assuming MCS-1 (i.e., the lowest MCS supported in EGPRS today) is combined with HARQ retransmissions to realize the needed level of data transmission performance. Support for extended coverage is realized by defining different coverage classes. A different number of blind repetitions are associated with each of the coverage classes wherein extended coverage is associated with coverage classes for which one or more blind repetitions are needed (i.e., an initial transmission without any subsequent blind repetitions is considered as the reference coverage). The number of total blind repetitions for a given coverage class (except coverage class 1) can differ between different logical channels. Note: a wireless device using coverage class 1 on the uplink only transmits a single instance of a radio block it sends on any given logical channel (i.e., no blind repetitions are needed). Similarly, a wireless device using coverage class 1 on the downlink is only sent a single instance of a radio block on any given logical channel (i.e., no blind repetitions are needed).

Nominal Paging Group: The specific set of EC-PCH blocks a device monitors once per eDRX cycle. The device determines this specific set of EC-PCH blocks using an algorithm that takes into account its IMSI, its eDRX cycle length and its downlink coverage class.

The anticipated ubiquitous deployment of wireless devices used for what is known as Machine-Type-Communication (MTC) will result in wireless devices being placed outside the typical radio coverage of the existing radio networks, e.g., in basements and similar locations. One way to improve the radio coverage is by expanding the radio access network infrastructure, such as by adding additional Radio Base Station (RBS) equipment. This, however, may very quickly result in an unreasonable investment effort and may not be acceptable to operators.

An alternative approach to adding additional equipment is to keep the existing radio access network infrastructure unchanged but instead improve the radio coverage through novel radio transmission and reception techniques as well as new Radio Resource Management algorithms. The alternative approach is currently being discussed in the wireless industry and is a subject for a standardization effort, for example, in the 3rd-Generation Partnership Project (3GPP) as described in the 3GPP TR 36.824 V11.0.0 Technical Report, entitled "Evolved Universal Terrestrial Radio Access (E-UTRA); LTE coverage enhancements" and the 3GPP TSG-GERAN Meeting #62 Work Item Description GP-140421, entitled "New Study Item on Cellular System Support for Ultra Low Complexity and Low Throughput Internet of Things." The contents of these two documents are hereby incorporated herein by reference for all purposes.

While there are many techniques that can be used to enhance the radio coverage as discussed above, one technique that is of particular interest in the present disclosure is to enhance the radio coverage through the use of repeated transmissions (blind repetitions) based on coverage classes (CCs). The repeated transmissions technique is currently being considered in the context of the standardization work in 3GPP TSG RAN, as described in the above-referenced 3GPP TR 36.824 V11.0.0 Technical Report, entitled "Evolved Universal Terrestrial Radio Access (E-UTRA); LTE coverage enhancements" as well as in 3GPP TR 45.820 V1.3.0 Technical Report, entitled "Cellular System Support for Ultra Low Complexity and Low Throughput Internet of Things". The contents of these two documents are hereby incorporated herein by reference for all purposes.

As also described in 3GPP TSG-GERAN Meeting #63 Tdoc GP-140605, entitled "GSM Evolution for cellular IoT—PCH Overview" (the contents of which are incorporated herein by reference), wireless devices (e.g., those used for machine type communications (MTC)) can operate using different coverage classes and can be expected to make use of different extended discontinuous receive (eDRX) cycles ranging from minutes to hours or even days depending on the frequency of reachability desired for such wireless devices. As such, these wireless devices can transmit information to the radio access network (RAN) regarding their current (i.e., currently estimated) coverage class and eDRX cycle length within Radio Resources Control (RRC) or Non-Access Stratum (NAS) messages (e.g., GPRS Attach or Routing Area Update messages), thereby allowing the RAN node (e.g., BSS) or the Core Network node (e.g., SGSN) to determine the current coverage class and the periodicity with which the wireless devices will wake-up to look for a page according to their nominal paging group associated within their current coverage class and eDRX cycle. The total number of paging resources (paging blocks) per desired eDRX cycle can be determined based on coverage class, since each coverage class will need a different number of Paging Channel (PCH) block repetitions within the context of a single paging group. For example, considering a wireless communication network wherein a single 51-multiframe supports 8 PCH blocks, it can be the case where the desired eDRX cycle Y=256 51-multiframes 60 seconds (e.g., exactly 208 of these DRX cycles will occur within the overall TDMA Frame Number (FN) space of 2715648 TDMA frames). Accordingly, the number of paging groups supported within eDRX cycle Y can be determined by the coverage class of a wireless device that operates using that eDRX cycle as follows:

PCH blocks per eDRX cycle=PB_DRX_CYCLE=256×8=2048.

Coverage Class 1: Paging groups per eDRX cycle Y=PB_DRX_CYCLE=2048

Coverage Class 2: Paging groups per eDRX cycle Y=PB_DRX_CYCLE div 2=1024

Coverage Class 3: Paging groups per eDRX cycle Y=PB_DRX_CYCLE div 4=512

Coverage Class 4: Paging groups per eDRX cycle Y=PB_DRX_CYCLE div 8=256

Coverage Class 5: Paging groups per eDRX cycle Y=PB_DRX_CYCLE div 16=128

In view of the existing solutions, there are still problems associated with the repeated transmissions technique based on coverage classes. First of all, there is in principal no procedure available for a wireless device (e.g., EC-GSM device) to convey a change of its coverage class to the network (e.g., SGSN) other than via a Routing Area Update Procedure, which is very signalling intensive and is as such not suitable for wireless devices targeting a 10 year battery life time. Further, since the Routing Area Update procedure is very signalling intensive it adds signalling load to both the radio network interfaces and the core network interfaces. Second, the current proposals for the network (e.g., RAN node, BSS) to manage the paging groups for wireless devices are not optimized to handle a change in the DL CC just prior to the next occurrence of the nominal paging group for a given wireless device. These problems are discussed in more detail as follows:

- If the SGSN (network) is informed of the new DL CC shortly before the next occurrence of the nominal paging group based on the old DL CC and this results in a new nominal paging group that occurs well into the future compared to its old nominal paging group (e.g., 20 minutes), then this can effectively result in an excessively deferred paging opportunity.
- If a wireless device determines its paging group based on the current procedure, by mod(IMSI,N), where N is the number of paging groups within the eDRX cycle and the result of the operation is the paging block(s) to be monitored by the wireless device, then the nominal paging group for a given coverage class can occur uncorrelated from the nominal paging group associated with another coverage class, within the same eDRX cycle.
- In FIG. 1 (PRIOR ART) there is an illustration showing the current paging group procedure and the problem associated therewith within the context of four 51 multiframes 102a, 102b, 102c and 102d (around 1 second) where the difference between nominal paging groups (see patterned boxes) for different coverage classes namely CC1, CC2, CC3, CC4, CC5 and CC6 for the same wireless device could be as long as the full eDRX cycle (several minutes). This implies that the reachability pattern of the wireless device can be substantially impacted by changing the DL CC while maintaining the same eDRX cycle length.

These problems and other problems associated with the state-of-the-art are addressed by the present disclosure.

SUMMARY

A wireless device, a RAN node, a CN node, and various methods for addressing at least the aforementioned problems are described in the independent claims. Advantageous embodiments of the wireless device, the RAN node, the CN node, and the various methods are further described in the dependent claims.

In one aspect, the present disclosure provides a wireless device configured to communicate with a CN node. The wireless device comprises a processor and a memory that stores processor-executable instructions, wherein the processor interfaces with the memory to execute the processor-executable instructions, whereby the wireless device is operable to perform a determine operation, and a transmit operation. In the determine operation, the wireless device determines a current downlink (DL) coverage class (CC) needs to be changed to a higher DL CC or a lower DL CC. In the transmit operation, the wireless device, based on the determination of the need to change the current DL CC to the higher DL CC, transmits an indication of the higher DL CC for the CN node by performing a cell update procedure. The wireless device configured to implement the determine operation and the transmit operation is advantageous since this provides a technique to convey a change of its coverage class to the network (e.g., SGSN) other than by using a Routing Area Update Procedure which is very signalling intensive and is as such not suitable for wireless devices targeting a 10 year battery life time.

In another aspect, the present disclosure provides a method in a wireless device configured to communicate with a CN node. The method comprises a determining step, and a transmitting step. In the determining step, the wireless device determines a current downlink (DL) coverage class (CC) needs to be changed to a higher DL CC or a lower DL CC. In the transmitting step, the wireless device, based on the determination of the need to change the current DL CC to the higher DL CC, transmits an indication of the higher DL CC for the CN node by performing a cell update procedure. The wireless device configured to implement the determining step and the transmitting step is advantageous since this provides a technique to convey a change of its coverage class to the network (e.g., SGSN) other than by using a Routing Area Update Procedure which is very signalling intensive and is as such not suitable for wireless devices targeting a 10 year battery life time.

In yet another aspect, the present disclosure provides a RAN node configured to communicate with a wireless device. The RAN node comprises a processor and at least one memory that stores processor-executable instructions, wherein the processor interfaces with the at least one memory to execute the processor-executable instructions, whereby the RAN node is operable to perform a configuration operation. In the configuration operation, the RAN node configures a nominal paging group for a lowest coverage class (CC) within an extended Discontinuous Receive (eDRX) cycle for the wireless device to correlate with an additional nominal paging group associated with a higher CC within the eDRX cycle for the wireless device (note: the higher CC is a new CC of the wireless device). The RAN node typically performs this configuration operation in response to receiving a paging request from the CN node and as such the new CC refers to the actual DL CC included within the paging request (i.e., the new CC is also known as the DL CC currently stored by the CN node for the wireless device and comprises the last DL CC information provided to the CN node by the wireless device). The RAN node by being configured to implement the configuration operation is advantageous in that it substantially decreases the potential for missed pages to the wireless device.

In yet another aspect, the present disclosure provides a method in a RAN node configured to communicate with a wireless device. The method comprises a configuring step. In the configuring step, the RAN node configures a nominal paging group for a lowest coverage class (CC) within an extended Discontinuous Receive (eDRX) cycle for the wireless device to correlate with an additional nominal paging group associated with a higher CC within the eDRX cycle for the wireless device (note: the higher CC is a new CC of the wireless device). The RAN node typically performs this configuration operation in response to receiving a paging request from the CN node and as such the new CC refers to the actual DL CC included within the paging request (i.e., the new CC is also known as the DL CC currently stored by the CN node for the wireless device and comprises the last DL CC information provided to the CN node by the wireless device). The RAN node by being configured to implement the configuring step is advantageous in that it substantially decreases the potential for missed pages to the wireless device.

In yet another aspect, the present disclosure provides a CN node configured to communicate with a wireless device and a RAN node. The CN node comprises a processor and at least one memory that stores processor-executable instructions, wherein the processor interfaces with the at least one memory to execute the processor-executable instructions, whereby the CN node is operable to perform a receive operation. In the receive operation, the CN node receives, from the RAN node, an indication that a current DL CC for the wireless device needs to be changed to either a higher DL CC or a lower DL CC, wherein the indication is associated with an UL-UNITDATA PDU or a LLC PDU. In one example, the indication is received in an information element within the UL-UNITDATA PDU that is associated with an uplink transmission which is limited to a cell update procedure when the current DL CC needs to be changed to the higher DL CC. Alternatively, the indication is received in a field within the LLC PDU that is associated with an uplink transmission which is limited to a cell update procedure when the current DL CC needs to be changed to the higher DL CC. In another example, the indication is received in an information element within the UL-UNITDATA PDU that is associated with an uplink transmission which has another purpose in addition to a cell update procedure when the current DL CC needs to be changed to the lower DL CC. Alternatively, the indication is received in a field within the LLC PDU that is associated with an uplink transmission which has another purpose in addition to a cell update procedure when the current DL CC needs to be changed to the lower DL CC. The CN node by being configured to implement the receive operation is advantageous since this provides a technique to receive a change in the coverage class of the wireless device other than by using a Routing Area Update Procedure which is very signalling intensive and is as such not suitable for wireless devices targeting a 10 year battery life time.

In yet another aspect, the present disclosure provides a method in a CN node configured to communicate with a RAN node and a wireless device. The method comprises a receiving step. In the receiving step, the CN node receives, from the RAN node, an indication that a current DL CC for the wireless device needs to be changed to either a higher DL CC or a lower DL CC, wherein the indication is associated with an UL-UNITDATA PDU or a LLC PDU. In one example, the indication is received in an information element within the UL-UNITDATA PDU that is associated with an uplink transmission which is limited to a cell update procedure when the current DL CC needs to be changed to the higher DL CC. Alternatively, the indication is received in a field within the LLC PDU that is associated with an uplink transmission which is limited to a cell update procedure when the current DL CC needs to be changed to the higher DL CC. In another example, the indication is received in an information element within the UL-UNITDATA PDU that is associated with an uplink transmission which has another purpose in addition to a cell update procedure when the current DL CC needs to be changed to the lower DL CC. Alternatively, the indication is received in a field within the LLC PDU that is associated with an uplink transmission which has another purpose in addition to a cell update procedure when the current DL CC needs to be changed to the lower DL CC. The CN node by being configured to implement the receiving step is advantageous since this provides a technique to receive a change in the coverage class of the wireless device other than by using a Routing Area Update Procedure which is very signalling intensive and is as such not suitable for wireless devices targeting a 10 year battery life time.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 2:
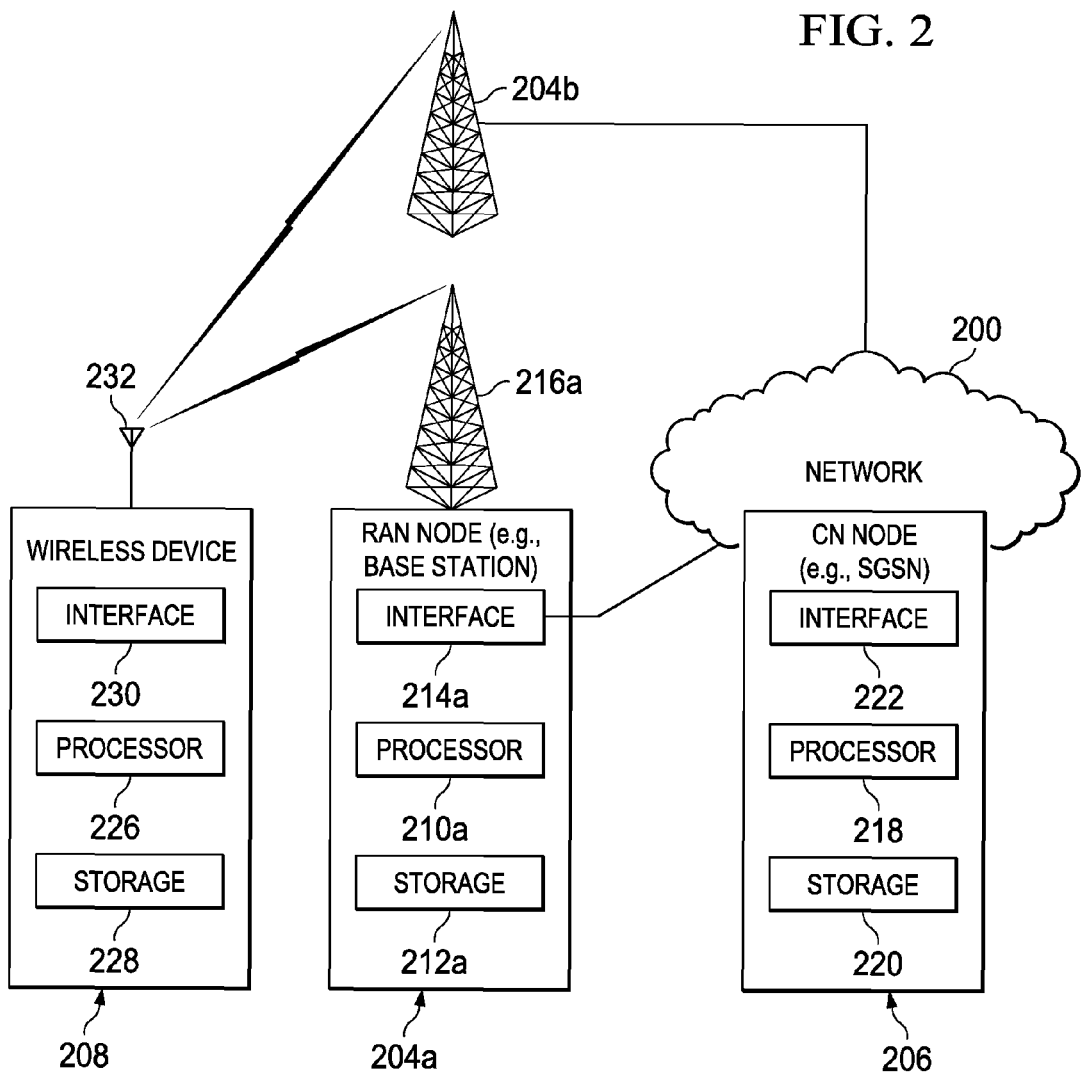
FIG. 2 is a diagram of an exemplary wireless communication network in accordance with an embodiment of the present disclosure.

To describe the technical features of the present disclosure, a discussion is provided first to describe an exemplary wireless communication network which includes a wireless device, RAN nodes (e.g., BSSs), and a CN node (e.g., SGSN), each of which are configured in accordance with different embodiments of the present disclosure (see FIG. 2). Then, a discussion is provided to explain the techniques implemented by the wireless device, the RAN node, and the CN node in accordance with different embodiments of the present disclosure (see FIGS. 3-5). Thereafter, a discussion is provided to explain in more detail the various techniques implemented by each of the wireless device, the RAN node, and the CN node in accordance with different embodiments of the present disclosure (see FIGS. 6-11).

Note: the scenarios described herein associated with the present disclosure are based on terminology associated with EC-GSM but it should be appreciated that the present disclosure is not limited to EC-GSM scenarios.

Exemplary Wireless Communication Network 200

FIG. 2 illustrates an exemplary wireless communication network 200 in accordance with the present disclosure. The wireless communication network 200 includes multiple RAN nodes 204a and 204b (only two shown) and a CN node 206 which interface with multiple wireless devices 208 (only one shown). The wireless communication network 200 also includes many well-known components, but for clarity, only the components needed to describe the features of the present disclosure are described herein. Further, the wireless communication network 200 is described herein as being a GSM/EGPRS wireless communication network 200 which is also known as an EDGE wireless communication network 200. However, those skilled in the art will readily appreciate that the techniques of the present disclosure which are applied to the GSM/EGPRS wireless communication network 200 are generally applicable to other types of wireless communication systems, including, for example, WCDMA, LTE, and WiMAX systems.

As shown, the RAN node 204a (e.g., BSS 204a) comprises a processor 210a, storage 212a, interface 214a, and antenna 216a (note: the RAN node 204b would have similar components as RAN node 204a). The CN node 206 (e.g., SGSN 206) comprises a processor 218, storage 220, and interface 222. The wireless device 208 comprises a processor 226, storage 228, interface 230, and antenna 232. These components may work together in order to provide RAN node 204a and 204b, CN node 206 and/or wireless device 208 functionality, such as providing wireless connections in the wireless communication network 200 and allowing for a change in estimated DL CC. Further, the RAN nodes 204a and 204b, the CN node 206, and the wireless device 208 include many well-known components, but for clarity, only the components needed to describe the features of the present disclosure are described herein.

In different embodiments, the wireless communication network 200 may comprise any number of wired or wireless networks, network nodes, base stations, controllers, wireless devices, relay stations, and/or any other components that may facilitate or participate in the communication of data and/or signals whether via wired or wireless connections. Further, the wireless communication network 200 may comprise or interface with one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

As discussed above, the RAN node 204a comprises the processor 210a, storage 212a, interface 214a, and antenna 216a. These components 210a, 212a, 214a and 216a are depicted as single boxes located within a single larger box. In practice however, the RAN node 204a (and RAN node 204b) may comprise multiple different physical components that make up a single illustrated component (e.g., interface 214a may comprise terminals for coupling wires for a wired connection and a radio transceiver for a wireless connection). Similarly, the RAN node 204a may comprise multiple physically separate components (e.g., a NodeB component and a RNC component, a BTS component and a BSC component, etc.), which may each have their own respective processor, storage, and interface components. In certain scenarios in which the RAN node 204a comprises multiple separate components (e.g., BTS and BSC components), one or more of the separate components may be shared among several network nodes. For example, a single RNC may control multiple NodeB's. In such a scenario, each unique NodeB and BSC pair may be a separate network node. In some embodiments, the RAN node 204a may be configured to support multiple radio access technologies (RATs). In such embodiments, some components may be duplicated (e.g., separate storage 212a for the different RATs) and some components may be reused (e.g., the same antenna 216a may be shared by the RATs).

The processor 210a may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other RAN node 204a components, such as storage 212a, RAN node 204a functionality. For example, processor 210a may execute instructions stored in storage 212a. Such functionality may include providing various wireless features discussed herein to wireless devices, such as wireless device 208, including any of the features or benefits disclosed herein.

The storage 212a may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 212a may store any suitable instructions, data or information, including software and encoded logic, utilized by RAN node 204a. Storage 212a may be used to store any calculations made by processor 210a and/or any data received via interface 214a.

The RAN node 204a also comprises the interface 214a which may be used in the wired or wireless communication of signaling and/or data between the RAN node 204a, the wireless communication network 200, RAN node 204b, and/or the wireless device 208. For example, the interface 214a may perform any formatting, coding, or translating that may be needed to allow the RAN node 204a to send and receive data from the wireless communication network 200 over a wired connection. The interface 214a may also include a radio transmitter and/or receiver that may be coupled to or a part of antenna 216a. The radio may receive digital data that is to be sent out to other network nodes or wireless devices via a wireless connection. The radio may convert the digital data into a radio signal having the appropriate channel and bandwidth parameters. The radio signal may then be transmitted via antenna 216a to the appropriate recipient (e.g., wireless device 208). It should be appreciated that the CN node 206's processor 218, storage 220 and interface 222 may be the same as or similar to the RAN node 204a's processor 210a, storage 212a and interface 214a.

The antenna 216a may be any type of antenna capable of transmitting and receiving data and/or signals wirelessly. In some embodiments, the antenna 216a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

The wireless device 208 may be any type of wireless endpoint, mobile station, mobile phone, wireless local loop phone, smartphone, IoT, user equipment, desktop computer, PDA, cell phone, tablet, laptop, VoIP phone or handset, which is able to wirelessly send and receive data and/or signals to and from a network node, such as RAN node 204. As discussed above, the wireless device 208 comprises the processor 226, storage 228, interface 230, and antenna 232. Like the RAN node 204a, the components of the wireless device 208 are depicted as single boxes located within a single larger box, however in practice the wireless device 208 may comprise multiple different physical components that make up a single illustrated component (e.g., storage 228 may comprise multiple discrete microchips, each microchip representing a portion of the total storage capacity).

The processor 226 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other components of the wireless device 208, such as storage 228, wireless device 208 functionality. Such functionality may include providing various wireless features discussed herein, including any of the features or benefits disclosed herein.

The storage 228 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. The storage 228 may store any suitable data, instructions, or information, including software and encoded logic, utilized by the wireless device 208. The storage 228 may be used to store any calculations made by the processor 226 and/or any data received via the interface 230.

The interface 230 may be used in the wireless communication of signaling and/or data between the wireless device 208 and the RAN node 204a (or RAN node 204b). For example, the interface 230 may perform any formatting, coding, or translating that may be needed to allow the wireless device 208 to send to and receive data from the RAN node 204a over a wireless connection. The interface 230 may also include a radio transmitter and/or receiver that may be coupled to or a part of antenna 232. The radio may receive digital data that is to be sent out to the RAN node 204a via a wireless connection. The radio may convert the digital data into a radio signal having the appropriate channel and bandwidth parameters. The radio signal may then be transmitted via antenna 232 to the RAN node 204a.

The antenna 232 may be any type of antenna capable of transmitting and receiving data and/or signals wirelessly. In some embodiments, the antenna 232 may comprise one or more omni-directional, sector or panel antennas operable to transmit/receive radio signals between 2 GHz and 66 GHz. For simplicity, the antenna 232 may be considered a part of the interface 230 to the extent that a wireless signal is being used.

In some embodiments, the components described above may be used to implement one or more functional modules used in EC-GSM—Dynamic Coverage Class Update. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by processors 210a, 218 and/or 226, possibly in cooperation with storage 212a, 220, and/or 228. Processors 210a, 218 and/or 226, and storage 212a, 220, and/or 228 may thus be arranged to allow processors 210a, 218 and/or 226 to fetch instructions from storage 212a, 220, and/or 228 and execute the fetched instructions to allow the respective functional module to perform any features or functions disclosed herein. The modules may further be configured to perform other functions or steps not explicitly described herein but which would be within the knowledge of a person skilled in the art.

Techniques Implemented by Devices 208, 204a and 206

Even though the wireless device 208 (e.g., EC-GSM device 208) is expected per the prior art to provide the CN node 206 (e.g., SGSN 206) with the wireless device 208's estimated DL CC within, for example, the context of the RAU procedure, there remains the possibility that the wireless device 208 will change its estimated DL CC at any time between any two such successive RAU procedures. As such, allowing for a change in estimated DL CC should be supported using a method per the present disclosure that:

Avoids expensive NAS layer communications being triggered to update the CN node 206 (e.g., SGSN 206) with a new estimated DL CC.

Prevents the new nominal paging group corresponding to the new DL CC from occurring at a substantially earlier or later point within the eDRX cycle than the old nominal paging group in order to minimize the potential for missed pages.

Allow for a paging group of a lower coverage class (less resources needed to reach the wireless device 208) to be comprised of a set of paging blocks that occur as a sub-set of the paging blocks comprising the paging group of a higher coverage class for the same eDRX cycle.

Removing the mandatory need for a wireless device 208 to communicate with the network when changing from a higher to lower coverage class.

The methods described in the present disclosure are based on a proposal to extend coverage in GSM hence the use of terms like EC-GSM and eDRX. However, the principles of the present disclosure generally apply for any system where paging based reachability of wireless devices is used, and where the wireless device can be defined to be in different states when configured to use a given eDRX cycle length. The different states here imply the monitoring of different paging resources depending on the wireless device state (e.g., the state can be based on the DL CC used within the context of a given eDRX cycle).

1. Method for Updating DL Coverage Class 1.1 Pre-Paging Group Update of DL CC

This method is especially suitable to, but is not limited to, the case where the coverage class has deteriorated such that the wireless device 208 (e.g., EC-GSM device 208) will not be able to decode the paging message using the number of repetitions (i.e., the number of paging blocks needed for a wireless device 208 to receive a paging message on the radio interface as determined by its current coverage class) corresponding to the downlink coverage class last provided to the CN node 206 (e.g., SGSN 206). To reduce the possibility of excessive signaling between the wireless device 208 and the CN node 206 (e.g., SGSN 206), whenever the wireless device 208 determines its current DL CC should be changed it can wait until shortly before (e.g., a predetermined time such as 5 seconds) the next occurrence of its nominal paging group (i.e., based on its current DL CC) before performing a cell update that conveys or transmits (e.g., via the RAN node 204a) an indication of its new DL CC to the CN node 206 (e.g., SGSN 206). The use of the cell update procedure requires the transmission of only a single RLC data block and is therefore a power efficient way of triggering a DL CC update in the CN node 206 (e.g., SGSN 206). In addition, by having the wireless device 208 wait until just before or shortly before the next occurrence of its nominal paging group to finally determine that its DL CC needs to be changed ensures that the cell update will be used as sparingly as possible. This solution is useful whenever the wireless device 208 changes to a higher coverage class (requiring more blind repetitions) in order for the wireless device 208 to be able to, with a higher degree of probability, read a page that may have been sent using its nominal paging group. This does not guarantee that the wireless device 208 will always be able to read a page sent using the nominal paging group indicated by its recently transmitted cell update but it will reduce the probability of missing a page to the point where secondary paging mechanisms are not seen as being necessary. The specific information that indicates a higher DL CC is to be used for paging the wireless device 208 can be carried from the wireless device 208 to the RAN node 204a or from the wireless device 208 to the CN node 206 in any one of a variety of ways, including (for example):

- Using a code point within the access request sent on the RACH, requesting UL TBF resources to send the cell update (e.g., the wireless device 208 transmits to the RAN node 204a).
- Using information carried within the LLC PDU that serves as the cell update message (see section 1.2.1) (e.g., the wireless device 208 transmits to the CN node 206).
- Using information carried within the RLC data block used to convey the LLC PDU with the assigned UL TBF resources (e.g., the wireless device 208 transmits to the RAN node 204a).
- Using the RLC/MAC header content (e.g., using unused bits in the header to indicate an updated coverage class) (e.g., the wireless device 208 transmits to the RAN node 204a).

1.2 Transaction Time Update of DL CC

This method is suitable if the coverage class has improved such that the wireless device 208 (e.g., EC-GSM device 208) will be able to decode the paging message using a smaller number of repetitions than the number of repetitions corresponding to the downlink coverage class last provided to the CN node 206 (e.g., SGSN 206). In other words, because the wireless device 208 has determined that its coverage class has improved it can wait until the next occurrence of an uplink transaction to inform the CN node 206 (e.g., SGSN 206) of the new DL CC (i.e., instead of performing a cell update shortly before its next nominal paging group as per the method described in section 1.1 for changing to a higher DL CC). This is possible because the wireless device 208 can safely continue to use its current DL CC to read paging messages since the wireless device 208 is currently in a better coverage class than what the CN node 206 (e.g., SGSN 206) currently assumes. The advantage with this method is that no explicit signaling is needed prior to the occurrence of the next nominal paging group as per the method described in section 1.1 for changing to the higher DL CC.

1.2.1 Conveying Updated DL CC Information Using SAPI

Updating the CN node 206 (e.g., SGSN 206) to use a new DL CC for a given wireless device 208 can be realized using reserved SAPI values in the LLC header whenever the wireless device 208 establishes an UL TBF to send uplink data of any kind (e.g., the uplink data may be a report, an application layer ACK, a page response or a cell update) to the network.

One example of using reserved SAPI values in the LLC header is shown in TABLE 1 below. The LLC protocol is specified in 3GPP TS 44.064 V12.0.0 (2014-09) (the contents of which are hereby incorporated herein by reference).

SAPI allows 16 service access points to be specified. The SAPI values are allocated as shown in TABLE 1 with the modification per the present disclosure that five reserved SAPI values (see bold text) have been changed to signal the current coverage class as estimated by the wireless device 208.

The legacy LL3, LL5, LL9 and LL11 SAPIs can correspond to coverage class 1 devices where, per one embodiment of the present disclosure, 5 new LLC SAPIs with coverage classes specific for CC2 and above are added as shown in the bold text in TABLE 1.

This method for conveying the updated DL CC is applicable when the DL coverage class of the wireless device 208 (e.g., EC-GSM device 208) is lower (i.e., better radio conditions) or higher (i.e., worse radio conditions) than the DL CC previously signaled to the CN node 206 (e.g., SGSN 206).

TABLE 1

Allocation of SAPI values

| SAPI | Related Service | SAP Name |
| --- | --- | --- |
| 0000 | Reserved | — |
| 0001 | GPRS Mobility Management | LLGMM |
| 0010 | Tunnelling of messages 2 | TOM2 |
| 0011 | User data 3 | LL3 |
| 0100 | Reserved | — |
| 0101 | User data 5 | LL5 |
| 0110 | Reserved | — |
| 0111 | SMS | LLSMS |
| 1000 | Tunnelling of messages 8 | TOM8 |
| 1001 | User data 9 | LL9 |
| 1010 | ~~Reserved~~ Coverage Class 2 | LL10 |
| 1011 | User data 11 | LL11 |
| 1100 | ~~Reserved~~ Coverage Class 3 | LL12 |
| 1101 | ~~Reserved~~ Coverage Class 4 | LL13 |
| 1110 | ~~Reserved~~ Coverage Class 5 | LL14 |
| 1111 | ~~Reserved~~ Coverage Class 6 | LL15 |

1.2.2 Conveying Updated DL CC Information Using BSSGP

Another possibility for updating the CN node 206 (e.g., SGSN 206) with the DL coverage class is to modify the current 3GPP TS 48.018 UL-UNITDATA PDU which the RAN node 204a (e.g., BSS 204a) uses to transfer a wireless device 208's LLC-PDU and its associated radio interface information across the Gb-interface to the CN node 206 (e.g., SGSN 206). These modifications can be seen below in TABLE 2 which is the same as Table 10.2.2 in 3GPP TS 48.018 V12.4.0 (2014-11) (the contents of which are incorporated by reference herein) that describes the content of the UL-UNITDATA PDU, but TABLE 2 has been updated to include a new Coverage Class Information Element (IE). Whenever the wireless device 208 (e.g., EC-GSM device 208) accesses the network it transmits a RACH request to the RAN node 204a (e.g., BSS 204a) including an indication of its estimated DL CC so the RAN node 204a (e.g., BSS 204a) is able to properly assign resources and transmit the Immediate Assignment message with the appropriate number of repetitions to the wireless device 208 (e.g., EC-GSM device 208). This means that whenever the wireless device 208 (e.g., EC-GSM device 208) sends uplink data to the RAN node 204a (e.g., BSS 204a), the RAN node 204a (e.g., BSS 204a) may then add the latest coverage class information (see bold text in TABLE 2) to a UL-UNITDATA PDU which the RAN node 204a transmits to the CN node 206 (e.g., SGSN 206). This method for conveying an indication of the updated DL CC is applicable when the coverage class of the wireless device 208 (e.g., EC-GSM device 208) is lower (i.e., better radio conditions) or higher (i.e., worse radio conditions) than the DL CC previously signaled to the CN node 206 (e.g., SGSN 206).

TABLE 2

UL-UNITDATA PDU content

| Information element | Type/Reference | Presence | Format | Length |
|---|---|---|---|---|
| PDU type | PDU type/11.3.26 | M | V | 1 |
| TLLI | TLLI/11.3.35 | M | V | 4 |
| QoS Profile | QoS Profile/11.3.28 | M | V | 3 |
| Cell Identifier (note 5) | Cell Identifier/11.3.9 | M | TLV | 10 |
| PFI | PFI/11.3.42 | O | TLV | 3 |
| LSA Identifier List | LSA Identifier List/11.3.18 | O | TLV | 3-? |
| Redirect Attempt Flag (Note 3) | Redirect Attempt Flag/11.3.111 | O | TLV | 3 |
| IMSI (note 2) | IMSI/11.3.14 | O | TLV | 5-10 |
| Unconfirmed send state variable (note 4) | Unconfirmed send state variable/11.3.214 | O | TLV | 4 |
| Selected PLMN ID (note 5) | Selected PLMN ID/11.3.218 | O | TLV | 5 |
| Alignment octets | Alignment octets/11.3.1 | O | TLV | 2-5 |
| Coverage Class* | Coverage Class/11.3.xxx | O | V | 2 |
| LLC-PDU (note 1) | LLC-PDU/11.3.15 | M | TLV | 2-? |

NOTE 1:
The LLC-PDU Length Indicator may be zero.
NOTE 2:
IMSI may be included if available and if Redirect Attempt Flag is present.
NOTE 3:
This element indicates that the core network may respond with either Redirection Indication IE or Redirection Completed IE in DL_UNITDATA
NOTE 4:
Unconfirmed send state variable shall be included if received in the previous DL_UNITDATA.
NOTE 5:
Selected PLMN ID shall be included in the case of a mobile station supporting network sharing when a foreign TLLI or a random TLLI is included in the UL-UNIDATA PDU; in such a case the Common PLMN ID shall be included within the Cell Identifier IE
*Indicates the new Coverage Class Information Element added per an embodiment of the present disclosure to 3GPP TS 48.018 V12.4.0 (2014-11).

One possible way to realize the new Coverage Class Information Element shown above it to revise 3GPP TS 48.018 V12.4.0 (2014-11) as follows:

11.3.xxx Coverage Class

The purpose of the Coverage Class information element is to allow the BSS to update the stored Coverage class in the SGSN of an EC-GSM device.

The Coverage Class information element would be coded as shown in TABLE 3 (which would be a new Table 11.3.xxxx2.2 in 3GPP TS 48.018 V12.4.0 (2014-11)).

TABLE 3

| Coverage Class | | | | | | | |
|---|---|---|---|---|---|---|---|
| 8 | 7 | 6 | 5 | 4 | 3 | 2 | 1 |
| IEI | | | | | | | octet 1 |
| Coverage Class | | | | | | | octet 2 |
| Coverage class value (octet 2) | | | | | | | |
| Bits | | | | | | | |
| 4 | 3 | 2 | 1 | | | | |
| 0 | 0 | 0 | 1 | Coverage Class 1 | | | |
| 0 | 0 | 1 | 0 | Coverage Class 2 | | | |
| 0 | 0 | 1 | 1 | Coverage Class 3 | | | |
| 0 | 1 | 0 | 0 | Coverage Class 4 | | | |
| 0 | 1 | 0 | 1 | Coverage Class 5 | | | |
| 0 | 1 | 1 | 0 | Coverage Class 6 | | | |
| Other values are spare | | | | | | | |

It should be noted that in practice any uplink PDU or a new PDU on the Gb interface may be updated to convey the coverage class of the wireless device 208 (e.g., EC-GSM device 208) per the present disclosure.

2. Aligning Coverage Class Paging Groups 2.1 Solution

Figure 1:
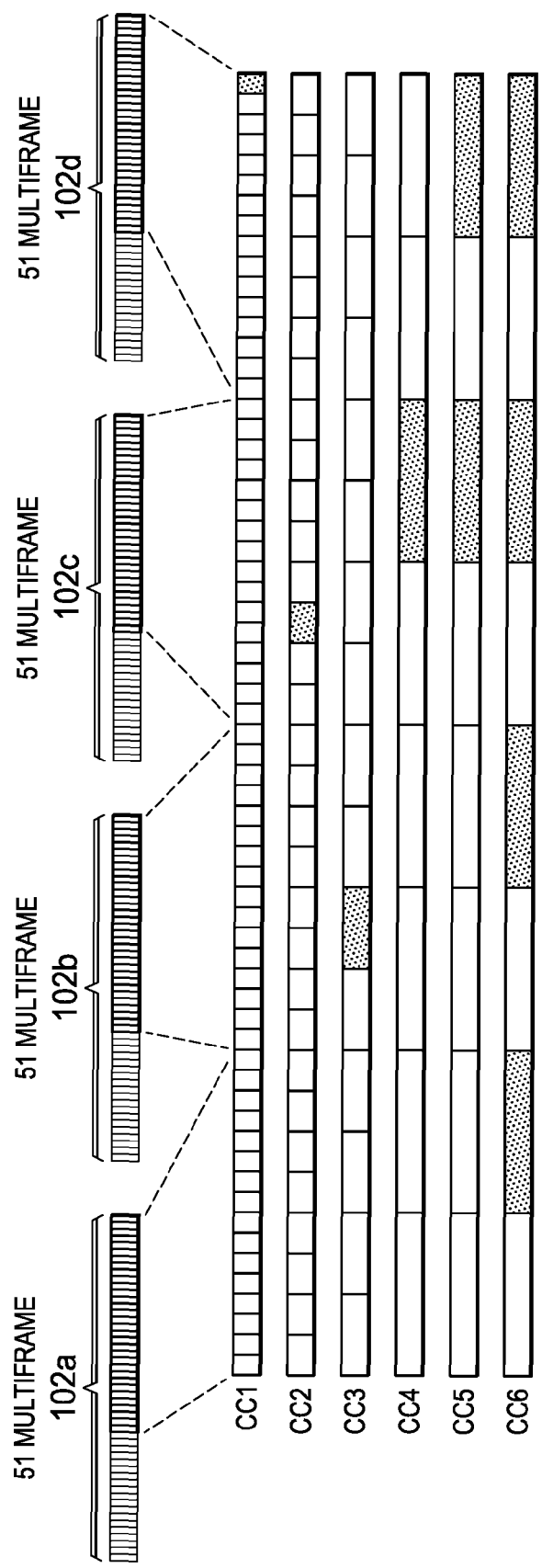
FIG. 1 (PRIOR ART) is an illustration showing the current paging group procedure and the problem associated therewith which is addressed by the present disclosure.

As discussed above in the Background Section, if a wireless device determines its paging group based on the current procedure, by mod (IMSI,N), where N is the number of paging groups within the eDRX cycle and the result of the operation is the paging block(s) to be monitored by the wireless device, then the nominal paging group for a given coverage class can occur uncorrelated (in time) from the nominal paging group associated with another coverage class, within the same eDRX cycle. If the nominal paging groups are uncorrelated with respect to the coverage classes, then if the wireless device 208 has a change in the coverage class the new nominal paging group corresponding to the new DL CC can occur at a substantially earlier or later point within the eDRX cycle when compared to the old nominal paging group, thus increasing the potential for missed pages (see FIG. 1). To address this problem and avoid the nominal paging groups corresponding to different coverage classes being spread-out in time, the RAN node 204a (e.g., BSS 204a) can configure the nominal paging group for a lowest coverage class (CC) within the eDRX cycle for the wireless device 208 to correlate with an additional nominal paging group associated with a higher CC (i.e., the new CC of wireless device 208) within the eDRX cycle for the wireless device 208. The wireless device 208 in order to communicate with the RAN node 204a (e.g., BSS 204a) would also configure in a similar manner the nominal paging group for the lowest coverage class (CC) within the eDRX cycle to correlate with the additional nominal paging group associated with a higher CC (i.e., the new CC of wireless device 208) within the eDRX cycle.

In one embodiment, this correlation can be accomplished where the RAN node 204a (e.g., BSS 204a) first identifies the specific nominal paging group supported within a given eDRX cycle for a given wireless device 208 (e.g., identifiable by its IMSI) by assuming (e.g., determining by default) CC1 (the lowest CC) as the current DL CC of the wireless device 208. This nominal paging group corresponds to a single block (EC-PCH block) and is denoted herein as the "benchmark EC-PCH block" or "benchmark paging block." The RAN node 204a then takes into account the actual new CC wherein it identifies the full set of paging blocks (EC-PCH blocks) associated with the actual new CC and follows the principle that the full set of EC-PCH paging blocks used for the actual new CC shall also comprise the benchmark EC-PCH block. The nominal paging group for the wireless device 208 therefore comprises all EC-PCH blocks corresponding to its actual new CC. For example, if the EC-PCH resources used on the EC-PCH for coverage class 5 is defined as $EC\text{-}PCH_{CC5}$, then $EC\text{-}PCH_{CC4}$ shall be a subset of $EC\text{-}PCH_{CC5}$, $EC\text{-}PCH_{CC3}$ shall be a subset of $EC\text{-}PCH_{CC4}$, etc. . . . .

Figure 3:
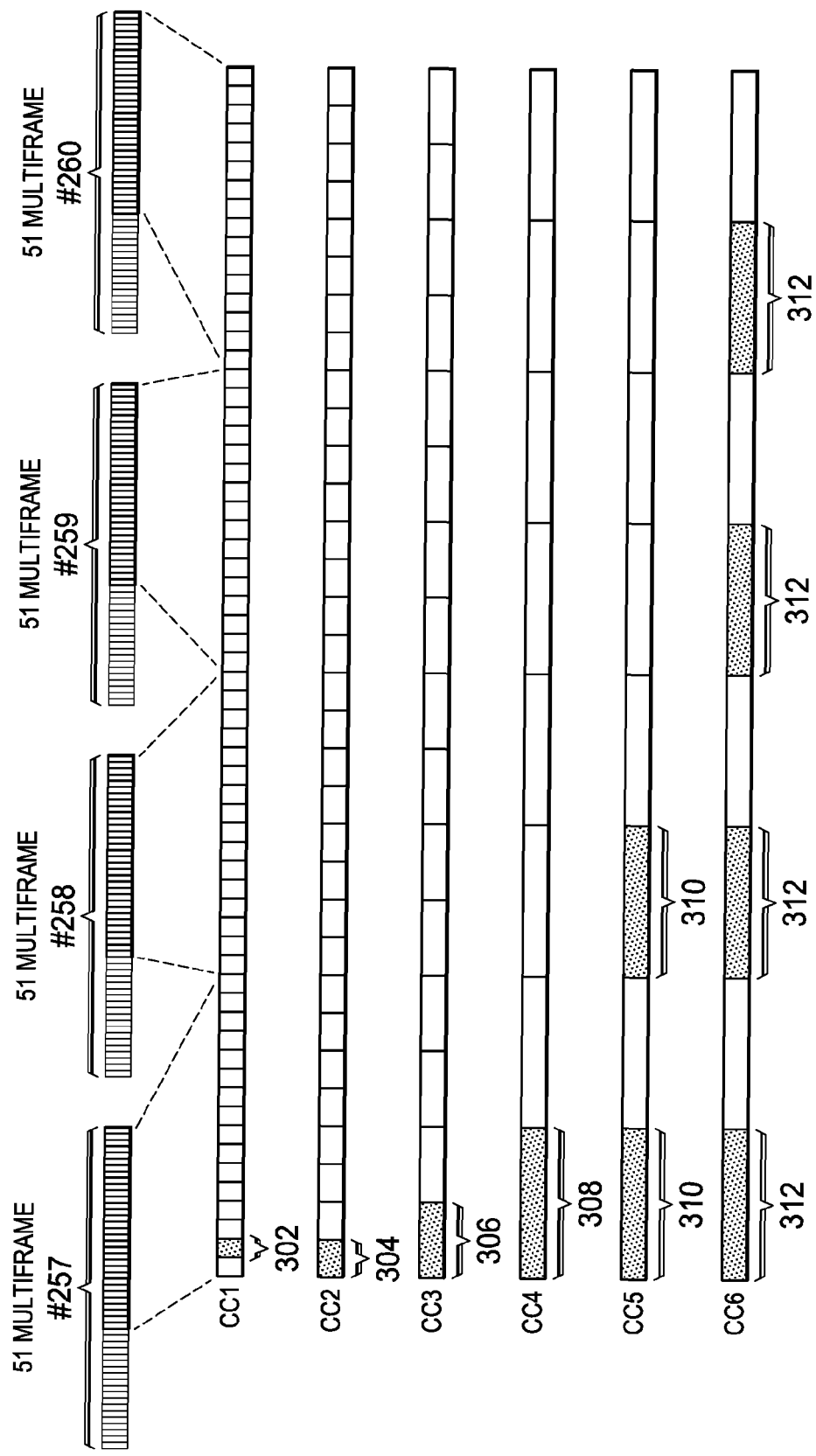
FIG. 3 is an illustration showing a first example of the new paging group procedure in accordance with an embodiment of the present disclosure.

This method is illustrated in TABLE 4 below where an example of how to map the logical EC-PCH channel onto physical resources within the 51 multiframe structure is shown. As can be seen, the benchmark EC-PCH block mapped onto TDMA frame 21 and 22 is included in all other EC-PCH blocks used for the nominal paging groups of all the higher coverage classes that could be used by the wireless device 208 for a given eDRX cycle (bold indication). This example is also illustrated in FIG. 3, and in FIGS. 4 and 5 with different benchmark EC-PCH blocks in each figure.

TABLE 4

Example of benchmark EC-PCH block and corresponding EC-PCH blocks of other coverage classes (CCs)

| Channel designation | Dir. | Repeat length TDMA frames | Coverage class (CC) | Interleaved block TDMA frame mapping |
|---|---|---|---|---|
| EC-PCH | D | 51 | 1 | B0(19, 20), B1(21, 22), . . . , B15(49, 50) |
| | | 51 | 2 | B0(19, . . . , 22), B1(23, . . . , 26), . . . , B7(47, . . . , 50) |
| | | 51 | 3 | B0(19, . . . , 26), B1(27, . . . , 34), . . . , B3(43, . . . , 50) |
| | | 51 | 4 | B0(19, . . . , 34), B1(35, . . . , 50) |
| | | 102 | 5 | B0(19, . . . , 34 + 51N), B1(35, . . . , 50 + 51N), N = 0, 1 |
| | | 204 | 6 | B0(19, . . . , 34 + 51N), B1(35, . . . , 50 + 51N), N = 0, 1, 2, 3 |

By using this method, the set of EC-PCH blocks of interest for any given coverage class may be located within 4 51-multiframes (i.e., the maximum duration of the paging group of the worse coverage class) from the benchmark EC-PCH block (see Section 2.2 for a more complete explanation). A wireless device 208 (for example) that uses CC1 may use the benchmark EC-PCH block as its nominal paging group. If the wireless device 208's coverage class changes to CC2 or higher then it will establish a new nominal paging group wherein the EC-PCH block it monitors according to CC1 (i.e., the benchmark EC-PCH block) will be included within the set of EC-PCH blocks it monitors according to the new nominal paging group associated with the changed CC2 or higher.

Furthermore, a wireless device 208 (for example) changing its coverage class from a higher coverage class (associated with poor radio conditions) to a lower coverage class (associated with better radio conditions) does not necessarily have to indicate this to the network (e.g., SGSN 206) since it is always ensured that if the network (e.g., SGSN 206) pages the wireless device 208 according to the higher coverage class, the EC-PCH block(s) corresponding to the lower coverage class (which the wireless device 208 would monitor if the coverage class is reduced) will always be included in the set of EC-PCH blocks monitored according to a higher coverage class transmission (see section 1.2).

2.2 Paging Group Determination

When paging the wireless device 208 (e.g., EC-GSM device 208), in order to determine the specific set of EC-PCH blocks to use to send the page, the RAN node 204a (e.g., BSS 204a) needs to know:

the eDRX cycle the downlink coverage class (DL CC), and, the IMSI of the wireless device 208.

The DL CC is estimated by the wireless device 208 and communicated to the network 200 (e.g., SGSN 206) where it is stored. The estimated DL CC will determine the number of paging resources (EC-PCH blocks) required to be sent when paging the wireless device 208 in order for the network 200 to be able to reach the wireless device 208, with a high degree of probability.

To accomplish all this, the CN node 206 (e.g., SGSN 206) when sending a paging request to the RAN node 204a (e.g., BSS 204a) includes an indication of the eDRX cycle, the DL CC and the IMSI associated with the target wireless device 208, thereby allowing the RAN node 204a (e.g., BSS 204a) to determine the next occurrence of the nominal paging group for that wireless device 208 within its eDRX cycle as follows:

N is the number of paging groups corresponding to a given DL CC within a given eDRX cycle and is determined based on EXTENDED_DRX_MFRMS, EC_PCH_BLKS_MFRM, and CC_EC_PCH_BLKS where:

EXTENDED_DRX_MFRMS is the number of 51-multiframes per eDRX cycle determined as per TABLE 5 below.

EC_PCH_BLKS_MFRM indicates the number of EC-PCH blocks (i.e., the number of 2 bursts blocks) per 51-multiframe. For EC-GSM this can be fixed at 16 which is the equivalent of the legacy PCH_BLKS_MFRM parameter indicating 8 PCH blocks per 51-multiframe.

CC_EC_PCH_BLKS is the number of EC-PCH blocks required for a given DL CC (where the number of blind repetitions required for any given DL CC is pre-defined by the specifications).

The set of eDRX cycle lengths identified by TABLE 5 is selected such that each member of the set occurs an integral number of times within the full TDMA Frame Number (FN) space.

N=(EC_PCH_BLKS_MFRM×EXTENDED_DRX_MFRMS)/CC_EC_PCH_BLKS. The benchmark EC-PCH block for a wireless device using a given eDRX cycle is determined based on where the nominal paging group occurs for DL CC=1 (i.e., CC_EC_PCH_BLKS=1)

Benchmark EC-PCH block=Benchmark Nominal Paging Group=mod (IMSI, N) where N=(16×EXTENDED_DRX_MFRMS)/1.

TABLE 5

Set of eDRX Cycles Supported

| eDRX Cycle Value (EXTENDED_DRX) | Target eDRX Cycle Length | Number of 51-MF per eDRX Cycle (EXTENDED_DRX_MFRMS) | eDRX Cycles per TDMA FN Space |
|---|---|---|---|
| 0 | ~30 seconds | 128 | 416 |
| 1 | ~60 seconds | 256 | 208 |

TABLE 5-continued

Set of eDRX Cycles Supported

| eDRX Cycle Value (EX-TENDED_DRX) | Target eDRX Cycle Length | Number of 51-MF per eDRX Cycle (EXTEND-ED_DRX_MFRMS) | eDRX Cycles per TDMA FN Space |
|---|---|---|---|
| 2 | ~2 minutes | 512 | 204 |
| 3 | ~4 minutes | 1024 | 52 |
| 4 | ~6.5 minutes | 1664 | 32 |
| 5 | ~8 minutes | 2048 | 26 |
| 6 | ~13 minutes | 3328 | 16 |
| 7 | ~16 minutes | 4096 | 13 |
| 8 | ~26 minutes | 6656 | 8 |
| 9 | ~52 minutes | 13312 | 4 |

Note 1:
53248 51-multiframes occur with the TDMA FN space (2715648 TDMA frames)
Note 2:
All remaining EXTENDED_DRX values are reserved Example 1 (See FIG. 3)

IMSI=00000000 01001001 00110000 00000001=4796417 and EXTENDED_DRX_MFRMS=6656 (i.e., the eDRX cycle~26 minutes).
N=16*6656=106496.
Benchmark Nominal Paging Group=mod (IMSI, 106496)=4097 which occurs in the 4098$^{th}$ EC-PCH block (i.e., in the 2$^{nd}$ EC-PCH block (see pattern block 302 associated with CC1 in FIG. 3) of the eDRX cycle in 51-multiframe #257.
The nominal paging groups associated with other DL CCs for the same IMSI and eDRX cycle length are shown in FIG. 3. As shown, the nominal paging group for DL CC2 occurs in the 1$^{st}$ and 2$^{nd}$ EC-PCH blocks 304 of 51-multiframe #257. The nominal paging group for DL CC3 occurs in the 1$^{st}$, 2$^{nd}$, 3$^{rd}$ and 4$^{th}$ EC-PCH blocks 306 of 51-multiframe #257. The nominal paging group for DL CC4 occurs in the 1$^{st}$ through 8$^{th}$ EC-PCH blocks 308 of 51-multiframe #257. The nominal paging group for DL CC5 occurs in the 1$^{st}$ through 8$^{th}$ EC-PCH blocks 310 of 51-multiframes #257 and #258. The nominal paging group for DL CC6 occurs in the 1$^{st}$ through 8$^{th}$ EC-PCH blocks 312 of 51-multiframes #257 through #260.

Figure 4:
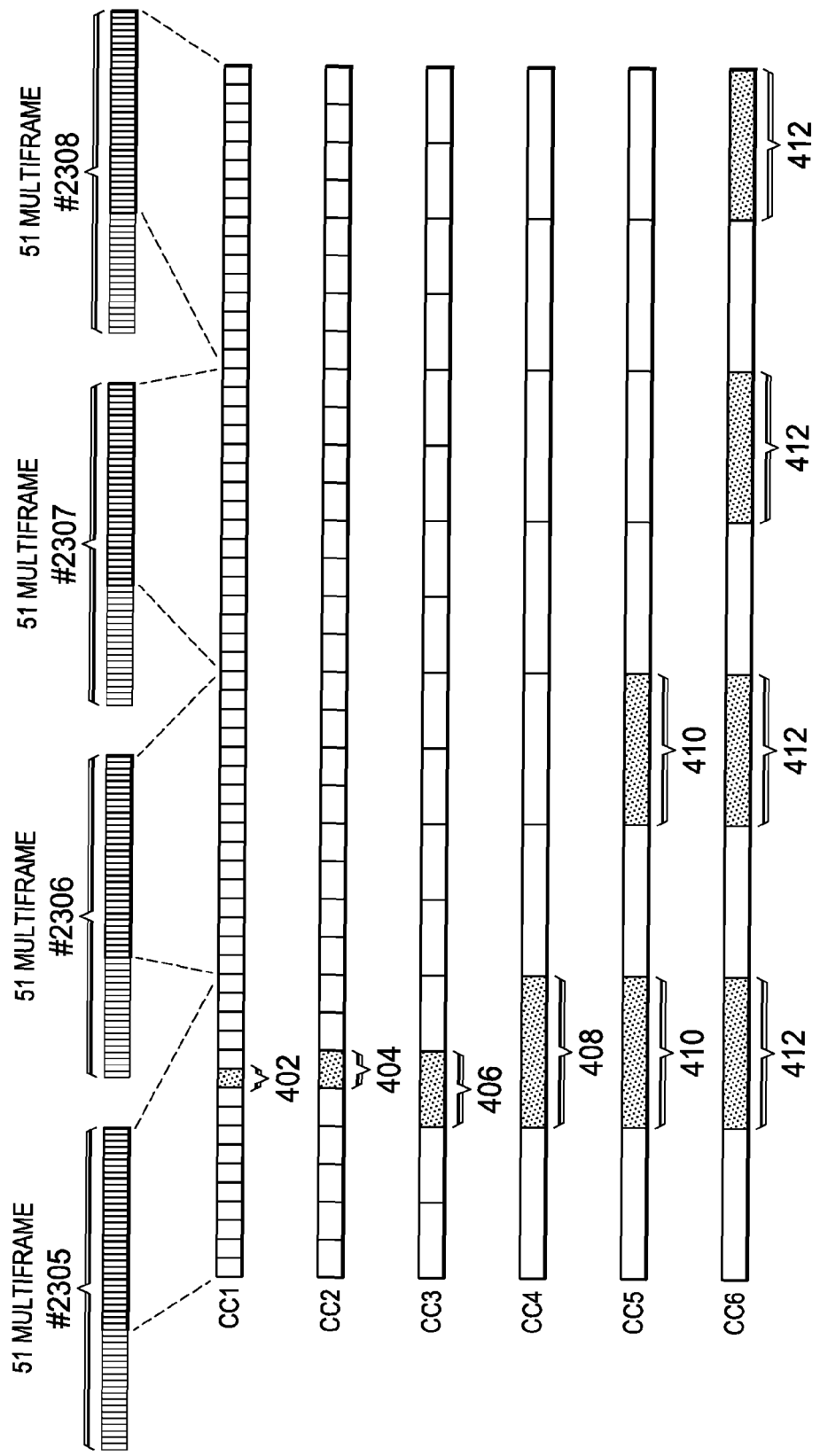
FIG. 4 is an illustration showing a second example of the new paging group procedure in accordance with an embodiment of the present disclosure.

Example 2 (See FIG. 4)

IMSI=00000000 00000010 00110000 00001010=143370 and EXTENDED_DRX_MFRMS=6656 (i.e., the eDRX cycle~26 minutes).
N=16*6656=106496.
Benchmark Nominal Paging Group=mod (IMSI, 106496)=36874 which occurs in the 36875$^{th}$ EC-PCH block (i.e., in the 11$^{th}$ EC-PCH block (see pattern block 402 associated with CC1 in FIG. 4) of the eDRX cycle in 51-multiframe #2305)
The nominal paging groups associated with other DL CC for the same IMSI and eDRX cycle length are shown in FIG. 4. As shown, the nominal paging group for DL CC2 occurs in the 11$^{th}$ and 12$^{th}$ EC-PCH blocks 404 of 51-multiframe #2305). The nominal paging group for DL CC3 occurs in the 9$^{th}$, 10$^{th}$, 11$^{th}$ and 12$^{th}$ EC-PCH blocks 406 of 51-multiframe #2305. The nominal paging group for DL CC4 occurs in the 9$^{th}$ through 16$^{th}$ EC-PCH blocks 408 of 51-multiframe #2305. The nominal paging group for DL CC5 occurs in the 9$^{th}$ through 16$^{th}$ EC-PCH blocks 410 of 51-multiframes #2305 and #2306. The nominal paging group for DL CC6 occurs in the 9$^{th}$ through 16$^{th}$ EC-PCH blocks 412 of 51-multiframes #2305 through #2308.

Figure 5:
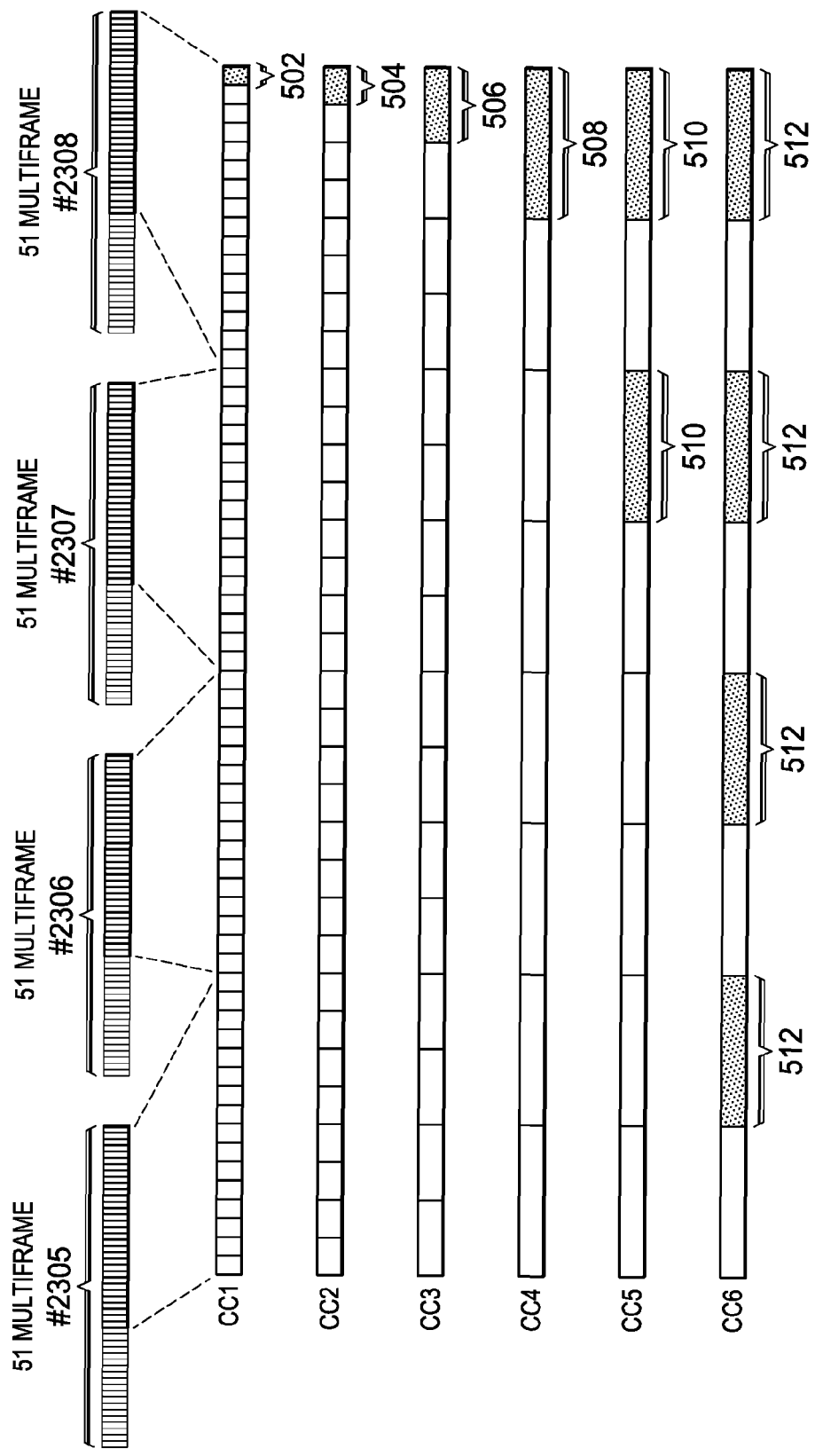
FIG. 5 is an illustration showing a third example of the new paging group procedure in accordance with an embodiment of the present disclosure.

Example 3 (See FIG. 5)

IMSI=00000000 00000010 00110000 00111111=143423 and EXTENDED_DRX_MFRMS=6656 (i.e., the eDRX cycle~26 minutes).
N=16*6656=106496.
Benchmark Nominal Paging Group=mod (IMSI, 106496)=36927 which occurs in the 36928$^{th}$ EC-PCH block (i.e., in the 16$^{th}$ EC-PCH block (see pattern block 502 associated with CC1 in FIG. 5) of the eDRX cycle in 51-multiframe #2308).
The nominal paging groups associated with other DL CC for the same IMSI and eDRX cycle length are shown in FIG. 5. As shown, the nominal paging group for DL CC2 occurs in the 15$^{th}$ and 16$^{th}$ EC-PCH blocks 504 of 51-multiframe #2308. The nominal paging group for DL CC3 occurs in the 13$^{th}$, 14$^{th}$, 15$^{th}$ and 16$^{th}$ EC-PCH blocks 506 of 51-multiframe #2308. The nominal paging group for DL CC4 occurs in the 9$^{th}$ through 16$^{th}$ EC-PCH blocks 508 of 51-multiframe #2308. The nominal paging group for DL CC5 occurs in the 9$^{th}$ through 16$^{th}$ EC-PCH blocks 510 of 51-multiframes #2307 and #2308. The nominal paging group for DL CC6 occurs in the 9$^{th}$ through 16$^{th}$ EC-PCH blocks 512 of 51-multiframes #2305 through #2308.

As can be seen in FIGS. 3-5, using this method for establishing CC specific nominal paging groups for a given eDRX cycle means that for a given IMSI (given wireless device 208) the nominal paging groups associated with the DL CCs will all fall within 4 51-multiframes of the benchmark EC-PCH block (i.e., for CC1 the benchmark EC-PCH can also be referred to as the Benchmark Nominal Paging Group). As such, if the wireless device 208 triggers a cell update e.g., 2 seconds prior to the next occurrence of its nominal paging group, the RAN node 204a (e.g., BSS 204a) will still be able to send a page in time for it to be received by the wireless device 208 that is now monitoring according to its DL CC incremented by 1 level. With the ability to update its DL CC as late as a few seconds before the next occurrence of its nominal paging group, the wireless device 208 will experience a substantially reduced probability of missing a page due to experiencing DL CC degradation while also conserving battery in that the wireless device 208 only performs a cell update to provide the CN node 206 with an updated DL CC only when absolutely needed (i.e., instead of immediately after any given instance of DL CC degradation). In other words, any given instance of CC degradation could be transient in nature and as such the wireless device 208 should wait as long as feasible (e.g., no less than 2 seconds prior to the next occurrence of its nominal paging group) to confirm that the degraded DL CC is still applicable. For example, if the current DL CC for the wireless device 208 is CC1 and a degradation to CC2 occurs but only lasts 1 minute at which point an improvement back to CC1 occurs and remains in effect until the next instance of its nominal paging group, then if the two changes of CC occur multiple minutes before the next instance of its nominal paging group the wireless device 208 will not need to perform a cell update following either of the two changes in DL CC (i.e., the wireless device 208 saves the battery consumption that would otherwise occur if a cell update was performed immediately after detecting either a degradation or improvement in DL CC).

Detailed Techniques Implemented by Devices 208, 204a and 206

Figure 6:
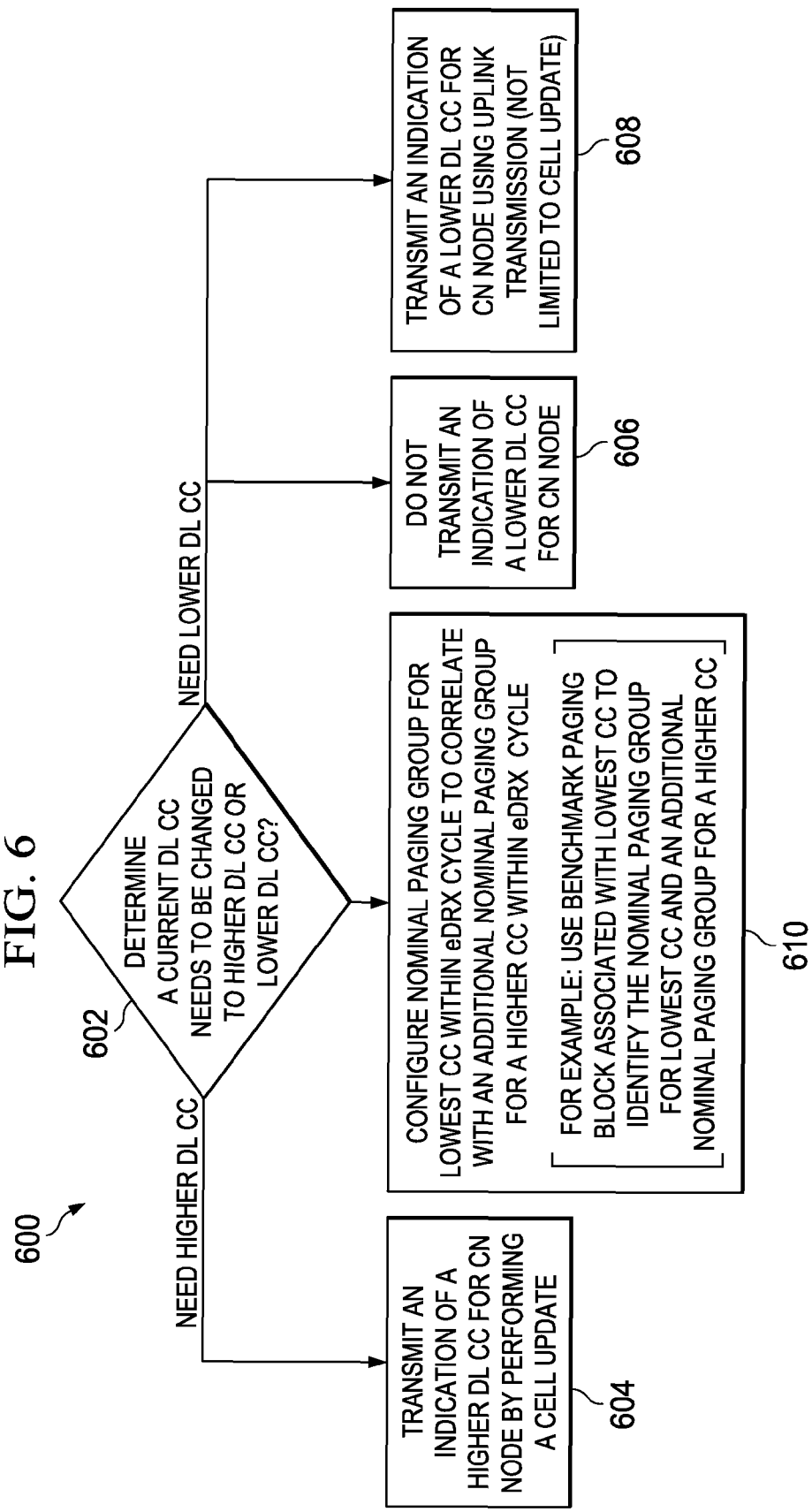
FIG. 6 is a flowchart of a method implemented in a wireless device in accordance with an embodiment of the present disclosure.

Referring to FIG. 6, there is a flowchart of a method 600 implemented in a wireless device 208 in accordance with an embodiment of the present disclosure. At step 602, the wireless device 208 determines that the current DL CC needs to be changed to a higher DL CC or a lower DL CC. For instance, the wireless device 208 can make this determination by periodically monitoring the logical channels known as FCCH and EC-SCH and thereby evaluate how quickly their respective content can be acquired (i.e., the more quickly these logical channels can be acquired the lower the coverage class of the wireless device 208).

Based on the determination in step 602 that the wireless device 208 needs to change the current DL CC to a higher DL CC, the wireless device 208 at step 604 transmits an indication of the higher DL CC for the CN node 206 (e.g., SGSN 206) by performing a cell update procedure, for example, before the next occurrence of its nominal paging group (determined using the current DL CC). For example, the wireless device 208 may transmit the indication of the higher DL CC for the CN node 206 (e.g., SGSN 206) by performing the cell update procedure and using one of the following (for example): (1) a code point within an access request sent on a RACH requesting UL TBF resources to send a cell update message; (2) a reserved SAPI value in a header of a LLC PDU that serves as the cell update message; (3) information carried within a RLC data block which conveys at least a portion of the LLC PDU using assigned UL TBF resources; and, (4) information carried within a RLC/MAC header of the RLC data block which conveys at least a portion of the LLC PDU using the assigned UL TBF resources. In one embodiment, the wireless device 208 would perform steps 602 and 604 at a predetermined time (e.g., 5 seconds) before a next occurrence of a nominal paging group. The wireless device 208 may transmit the indication of the higher DL CC to the RAN node 204a, which in turn may transmit the indication of the higher DL CC to the CN node 206.

Based on the determination in step 602 that the wireless device 208 needs to change the current DL CC to a lower DL CC, the wireless device 208 performs either step 606 or step 608. In step 606, wireless device 208 does not transmit an indication of the lower DL CC for the CN node 206 (e.g., SGSN 206). In step 608, the wireless device 208 transmits an indication of the lower DL CC in an uplink transmission (not restricted to a cell update as in step 604) for the CN node 206 (e.g., SGSN 206). In this case, the uplink transmission would have in addition to conveying (e.g., transmitting via the RAN node 204a) the indication of the lower DL CC to the CN node 206 (e.g., SGSN 206) another purpose such as sending uplink data of any kind including, for example, the uplink data may be a report, an application layer ACK, or a page response. Further, the wireless device 208 may transmit the indication of the lower DL CC for the CN node 206 (e.g., SGSN 206) in an uplink transmission (not restricted to a cell update as in step 604) using one of the following (for example): (1) a code point within an access request sent on a RACH requesting UL TBF resources to send the uplink transmission; (2) a reserved SAPI value in a header of a LLC PDU that serves as the uplink transmission; (3) information carried within a RLC data block which conveys at least a portion of the LLC PDU using assigned UL TBF resources; and (4) information carried within a RLC/MAC header of the RLC data block which conveys at least a portion of the LLC PDU using the assigned UL TBF resources. The wireless device 208 may transmit the indication of the lower DL CC to the RAN node 204a, which in turn may transmit the indication of the lower DL CC to the CN node 206.

At step 610, the wireless device 208 configures a nominal paging group for a lowest CC within an eDRX cycle associated with the wireless device 208 to correlate with an additional nominal paging group associated with a higher CC (i.e., the new CC of the wireless device 208) within the eDRX cycle (see earlier discussion in sections 2.1 and 2.2 about aligning coverage class paging groups). For instance, the wireless device 208 can perform step 610 by using a benchmark paging block associated with the lowest CC to identify the nominal paging group for the lowest CC (CC1) and an additional nominal paging group associated with the higher CC (i.e., the new CC of the wireless device 208) such that the additional nominal paging group has a set of paging blocks comprising the benchmark paging block. The RAN node 204a (e.g., BSS 204a) would perform these same steps such that both the wireless device 208 and the RAN node 204a (e.g., BSS 204a) have the same configured additional nominal paging group and as a result can communicate with one another.

Figure 7:
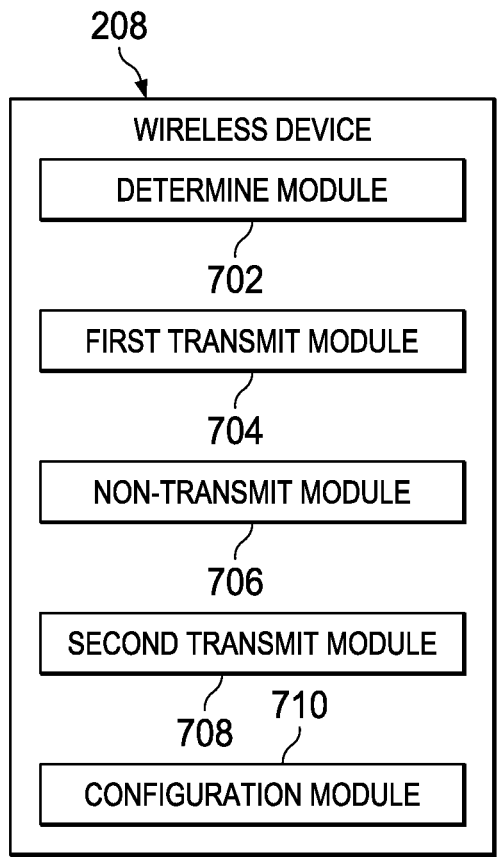
FIG. 7 is a block diagram illustrating structures of an exemplary wireless device in accordance with an embodiment of the present disclosure.

Referring to FIG. 7, there is a block diagram illustrating structures of an exemplary wireless device 208 configured to interact with the CN node 206 (e.g., SGSN 206) in accordance with an embodiment of the present disclosure. In an embodiment, the wireless device 208 may comprise a determine module 702, a first transmit module 704, a non-transmit module 706, a second transmit module 708, and a configuration module 710. The determine module 702 is configured to determine that the current DL CC needs to be changed to a higher DL CC or a lower DL CC. For instance, the determine module 702 can make this determination by periodically monitoring the logical channels known as FCCH and EC-SCH and thereby evaluate how quickly their respective content can be acquired (i.e., the more quickly these logical channels can be acquired the lower the coverage class of the wireless device 208)

Based on the determination that the wireless device 208 needs to change the current DL CC to a higher DL CC, the first transmit module 704 is configured to transmit an indication of the higher DL CC for the CN node 206 (e.g., SGSN 206) by performing a cell update procedure, for example, before the next occurrence of its nominal paging group (determined using the current DL CC). For example, the first transmit module 704 may transmit the indication of the higher DL CC for the CN node 206 (e.g., SGSN 206) by performing the cell update procedure and using one of the following (for example): (1) a code point within an access request sent on a RACH requesting UL TBF resources to send a cell update message; (2) a reserved SAPI value in a header of a LLC PDU that serves as the cell update message; (3) information carried within a RLC data block which conveys at least a portion of the LLC PDU using assigned UL TBF resources; and, (4) information carried within a RLC/MAC header of the RLC data block which conveys at least a portion of the LLC PDU using the assigned UL TBF resources. In one embodiment, the determine module 702 and the first transmit module 704 would perform their respective operations at a predetermined time (e.g., 5 seconds) before a next occurrence of a nominal paging group.

Based on the determination that the wireless device 208 needs to change the current DL CC to a lower DL CC, the non-transmit module 706 is configured to not transmit an indication of the lower DL CC for the CN node 206 (e.g., SGSN 206). Alternatively, the second transmit module 708 is configured to transmit an indication of the lower DL CC in an uplink transmission (not restricted to a cell update as in step 604) for the CN node 206 (e.g., SGSN 206). In this case, the uplink transmission would have in addition to conveying (e.g., transmitting via the RAN node 204a) the indication of the lower DL CC to the CN node 206 (e.g., SGSN 206) another purpose such as sending uplink data of any kind including, for example, the uplink data may be a report, an application layer ACK, or a page response. Further, the second transmit module 708 may transmit the indication of the lower DL CC for the CN node 206 (e.g., SGSN 206) in an uplink transmission (not restricted to a cell update as in step 604) using one of the following (for example): (1) a code point within an access request sent on a RACH requesting UL TBF resources to send the uplink transmission; (2) a reserved SAPI value in a header of a LLC PDU that serves as the uplink transmission; (3) information carried within a RLC data block which conveys at least a portion of the LLC PDU using assigned UL TBF resources; and (4) information carried within a RLC/MAC header of the RLC data block which conveys at least a portion of the LLC PDU using the assigned UL TBF resources.

The configuration module 710 is configured to configure a nominal paging group for a lowest CC within an eDRX cycle associated with the wireless device 208 to correlate with an additional nominal paging group associated with a higher CC (i.e., the new CC of the wireless device 208) within the eDRX cycle (see earlier discussion in sections 2.1 and 2.2 about aligning coverage class paging groups). For instance, the configuration module 710 can accomplish this by using a benchmark paging block associated with the lowest CC to identify the nominal paging group for the lowest CC (CC1) and an additional nominal paging group associated with a higher CC (i.e., the new CC of the wireless device 208) such that the additional nominal paging group has a set of paging blocks comprising the benchmark paging block.

As those skilled in the art will appreciate, the above-described modules 702, 704, 706, 708, and 710 of the wireless device 208 may be implemented separately as suitable dedicated circuits. Further, the modules 702, 704, 706, 708, and 710 can also be implemented using any number of dedicated circuits through functional combination or separation. In some embodiments, the modules 702, 704, 706, 708, and 710 may be even combined in a single application specific integrated circuit (ASIC). As an alternative software-based implementation, the wireless device 208 may comprise a memory 228, a processor 226 (including but not limited to a microprocessor, a microcontroller or a Digital Signal Processor (DSP), etc.) and an interface 230. The memory 228 stores machine-readable program code executable by the processor 226 to cause the wireless device 208 to perform the steps of the above-described method 600.

Figure 8:
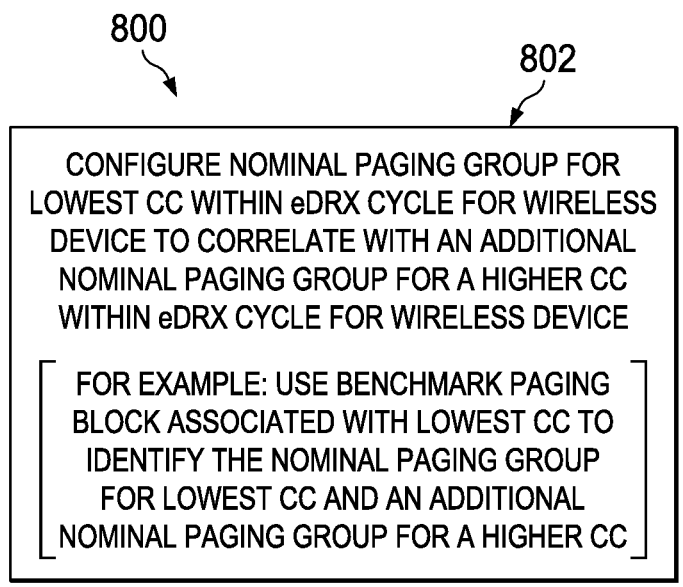
FIG. 8 is a flowchart of a method implemented in a RAN node (e.g., BSS) in accordance with an embodiment of the present disclosure.

Referring to FIG. 8, there is a flowchart of a method 800 implemented in a RAN node 204a (e.g., BSS 204a) (for example) in accordance with an embodiment of the present disclosure. At step 802, the RAN node 204a (e.g., BSS 204a) configures a nominal paging group for a lowest CC within an eDRX cycle associated with the wireless device 208 to correlate with an additional nominal paging group associated with a higher CC (i.e., the new CC of the wireless device 208) within the eDRX cycle associated with the wireless device 208 (see earlier discussion in sections 2.1 and 2.2 about aligning coverage class paging groups). For instance, the RAN node 204a (e.g., BSS 204a) can perform step 802 by using a benchmark paging block associated with the lowest CC to identify the nominal paging group for the lowest CC (CC1) and the additional nominal paging group associated with a higher CC (i.e., the new CC of the wireless device 208) such that the additional nominal paging group has a set of paging blocks comprising the benchmark paging block. The RAN node 204a typically performs this configuration operation in response to receiving a paging request from the CN node 206 and as such the new CC refers to the actual DL CC included within the paging request (i.e., the new CC is also known as the DL CC currently stored by the CN node 206 for the wireless device 208 and comprises the last DL CC information provided to the CN node 206 by the wireless device 208). The wireless device 208 would perform these same steps such that both the wireless device 208 and the RAN node 204a (e.g., BSS 204a) have the same configured additional nominal paging group and as a result can communicate with one another.

Figure 9:
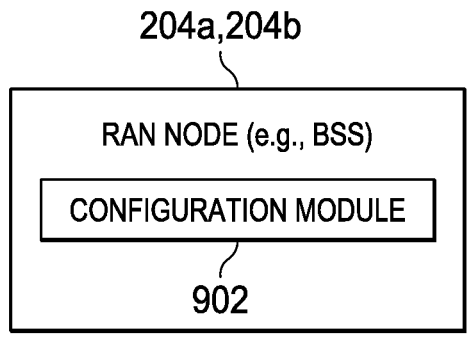
FIG. 9 is a block diagram illustrating structures of an exemplary RAN node (e.g., BSS) in accordance with an embodiment of the present disclosure.

Referring to FIG. 9, there is a block diagram illustrating structures of an exemplary RAN node 204a (e.g., BSS 204a) configured to interact with the wireless device 208 in accordance with an embodiment of the present disclosure. In an embodiment, the RAN node 204a (e.g., BSS 204a) may comprise a configuration module 902. The configuration module 902 is configured to configure a nominal paging group for a lowest CC within an eDRX cycle associated with the wireless device 208 to correlate with an additional nominal paging group associated with a higher CC (i.e., the new CC of the wireless device 208 within the eDRX cycle (see earlier discussion in sections 2.1 and 2.2 about aligning coverage class paging groups). For instance, the configuration module 902 can accomplish this by using a benchmark paging block associated with the lowest CC to identify the nominal paging group for the lowest CC (CC1) and the additional nominal paging group associated with the higher CC (i.e., the new CC of the wireless device 208) such that the additional nominal paging group has a set of paging blocks comprising the benchmark paging block. The configuration module 902 typically performs this configuration operation in response to the RAN node 204a receiving a paging request from the CN node 206 and as such the new CC refers to the actual DL CC included within the paging request (i.e., the new CC is also known as the DL CC currently stored by the CN node 206 for the wireless device 208 and comprises the last DL CC information provided to the CN node 206 by the wireless device 208).

As those skilled in the art will appreciate, the above-described module 902 of the RAN node 204a (e.g., BSS 204a) may be implemented as dedicated circuits. Further, the module 902 can also be implemented using any number of dedicated circuits through functional combination or separation. In some embodiments, the module 902 may be in a single application specific integrated circuit (ASIC). As an alternative software-based implementation, the RAN node 204a (e.g., BSS 204a) may comprise a memory 212a, a processor 210a (including but not limited to a microprocessor, a microcontroller or a Digital Signal Processor (DSP), etc.) and an interface 214a. The memory 212a stores machine-readable program code executable by the processor 210a to cause the RAN node 204a (e.g., BSS 204a) to perform the step of the above-described method 800.

Figure 10:
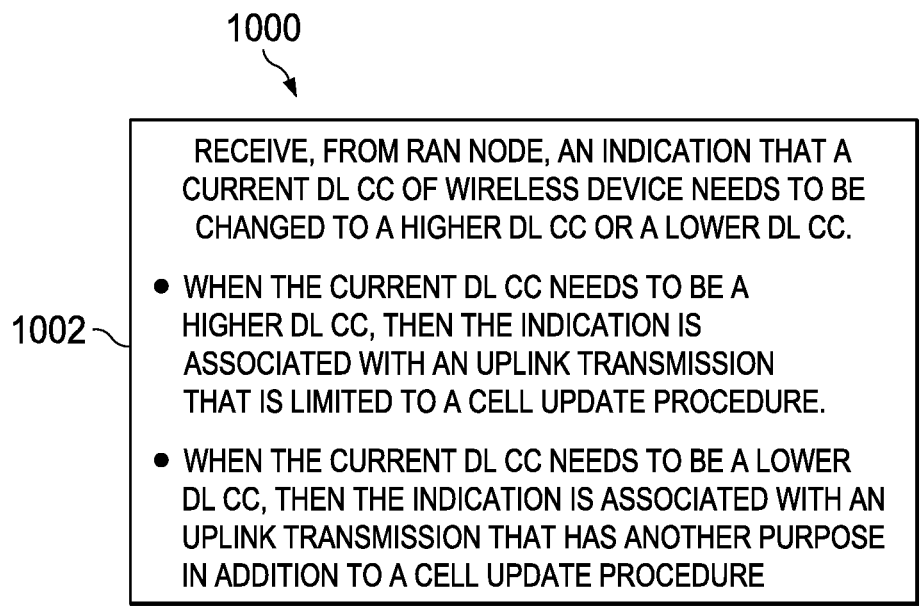
FIG. 10 is a flowchart of a method implemented in a CN node (e.g., SGSN) in accordance with an embodiment of the present disclosure.

Referring to FIG. 10, there is a flowchart of a method 1000 implemented in a CN node 206 (e.g., SGSN 206) in accordance with an embodiment of the present disclosure. At step 1002, the CN node 206 (e.g., SGSN 206) receives, from the RAN node 204a (e.g., BSS 204a), an indication that a current DL CC for the wireless device 208 needs to be changed to either a higher DL CC or a lower DL CC, wherein the indication is associated with an UL-UNITDATA PDU or a LLC PDU. In one example, the indication is received in an information element within the UL-UNITDATA PDU that is associated with an uplink transmission which is limited to a cell update procedure when the current DL CC needs to be changed to the higher DL CC. Alternatively, the indication is received in a field within the LLC PDU that is associated with an uplink transmission which is limited to a cell update procedure when the current DL CC needs to be changed to the higher DL CC. In another example, the indication is received in an information element within the UL-UNITDATA PDU that is associated with an uplink transmission which is not limited to (i.e., has another purpose in addition to) a cell update procedure when the current DL CC needs to be changed to the lower DL CC. Alternatively, the indication is received in a field within the LLC PDU that is associated with an uplink transmission which is not limited to (i.e., has another purpose in addition to) a cell update procedure when the current DL CC needs to be changed to the lower DL CC.

Figure 11:
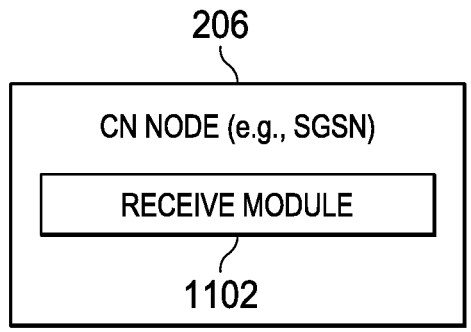
FIG. 11 is a block diagram illustrating structures of an exemplary CN node (e.g., SGSN) in accordance with an embodiment of the present disclosure.

Referring to FIG. 11, there is a block diagram illustrating structures of an exemplary CN node 206 (e.g., SGSN 206) in accordance with an embodiment of the present disclosure. In an embodiment, the CN node 206 (e.g., SGSN 206) may comprise a receive module 1102. The receive module 1102 is configured to receive, from the RAN node 204a (e.g., BSS 204a), an indication that a current DL CC for the wireless device 208 needs to be changed to either a higher DL CC or a lower DL CC, wherein the indication is associated with an UL-UNITDATA PDU or a LLC PDU. In one example, the indication is received in an information element within the UL-UNITDATA PDU that is associated with an uplink transmission which is limited to a cell update procedure when the current DL CC needs to be changed to the higher DL CC. Alternatively, the indication is received in a field within the LLC PDU that is associated with an uplink transmission which is limited to a cell update procedure when the current DL CC needs to be changed to the higher DL CC. In another example, the indication is received in an information element within the UL-UNITDATA PDU that is associated with an uplink transmission which is not limited to (i.e., has another purpose in addition to) a cell update procedure when the current DL CC needs to be changed to the lower DL CC. Alternatively, the indication is received in a field within the LLC PDU that is associated with an uplink transmission which is not limited to (i.e., has another purpose in addition to) a cell update procedure when the current DL CC needs to be changed to the lower DL CC.

As those skilled in the art will appreciate, the above-described module 1102 of the CN node 206 (e.g., CN node 206) may be implemented as dedicated circuits. Further, the module 1102 can also be implemented using any number of dedicated circuits through functional combination or separation. In some embodiments, the module 1102 may be in a single application specific integrated circuit (ASIC). As an alternative software-based implementation, the CN node 206 (e.g., CN node 206) may comprise a memory 220, a processor 218 (including but not limited to a microprocessor, a microcontroller or a Digital Signal Processor (DSP), etc.) and an interface 222. The memory 220 stores machine-readable program code executable by the processor 218 to cause the CN node 206 (e.g., CN node 206) to perform the steps of the above-described method 1000.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A wireless device configured to communicate with a Core Network (CN) node, the wireless device comprising:
   a processor; and,
   a memory that stores processor-executable instructions, wherein the processor interfaces with the memory to execute the processor-executable instructions to perform operations to:
   determine a current downlink (DL) coverage class (CC) needs to be changed to a higher DL CC or a lower DL CC;
   based on the determination of the need to change the current DL CC to the higher DL CC, transmit an indication of the higher DL CC for the CN node by performing a cell update procedure; and, wherein the determine operation and the transmit operation are performed at a predetermined time before a next occurrence of a nominal paging group.

2. The wireless device of claim 1, wherein the processor further executes the processor-executable instructions to transmit the indication of the higher DL CC by using one of the following:
- a code point within an access request sent on a Random Access Channel (RACH) requesting uplink (UL) Transport Block Format (TBF) resources to send a cell update message;
- a reserved Service Access Point Identifier (SAPI) value in a header of a Logical Link Control (LLC) Protocol Data Unit (PDU) that serves as the cell update message;
- information carried within a Radio Link Control (RLC) data block which conveys at least a portion of a LLC PDU using assigned UL TBF resources; and,
- information carried within a RLC/Media Access Control (MAC) header of the RLC data block which conveys at least a portion of the LLC PDU using the assigned UL TBF resources.

3. The wireless device of claim 1, wherein the processor further executes the processor-executable instructions to perform an operation to:
- based on the determination of the need to change the current DL CC to the lower DL CC, not transmit an indication of the lower DL CC for the CN node.

4. The wireless device of claim 1, wherein the processor further executes the processor-executable instructions to perform an operation to:
- based on the determination of the need to change the current DL CC to the lower DL CC, transmit an indication of the lower DL CC in an uplink transmission for the CN node, wherein the uplink transmission has another purpose in addition to indicating the lower DL CC for the CN node.

5. The wireless device of claim 4, wherein the processor further executes the processor-executable instructions to transmit the indication of the lower DL CC in the uplink transmission for the CN node by using one of the following:
- a code point within an access request sent on a Random Access Channel (RACH) requesting uplink (UL) Transport Block Format (TBF) resources to send the uplink transmission;
- a reserved Service Access Point Identifier (SAPI) value in a header of a Logical Link Control (LLC) Protocol Data Unit (PDU) that serves as the uplink transmission;
- information carried within a Radio Link Control (RLC) data block which conveys at least a portion of a LLC PDU using assigned UL TBF resources; and,
- information carried within a RLC/Media Access Control (MAC) header of the RLC data block which conveys at least a portion of the LLC PDU using the assigned UL TBF resources.

6. The wireless device of claim 1, wherein the higher DL CC indicates at least one more blind repetition is needed than provided by the current DL CC, and wherein the lower DL CC indicates at least one less blind repetition is needed than provided by the current DL CC.

7. The wireless device of claim 6, wherein the processor further executes the processor-executable instructions to determine based on radio conditions the current DL CC needs to be changed to the higher DL CC or the lower DL CC.

8. The wireless device of claim 1, wherein the processor further executes the processor-executable instructions to perform an operation to:
- configure a nominal paging group for a lowest CC within an extended Discontinuous Receive (eDRX) cycle associated with the wireless device to correlate with an additional nominal paging group associated with a higher CC within the eDRX cycle.

9. The wireless device of claim 8, wherein the processor further executes the processor-executable instructions to perform the configure operation as follows:
- use a benchmark paging block associated with the lowest CC to identify the nominal paging group for the lowest CC and the additional nominal paging group such that the additional nominal paging group associated with the higher CC has a set of paging blocks comprising the benchmark paging block.

10. The wireless device of claim 1, wherein the processor further executes the processor-executable instructions to perform an operation to:
- based on the determination of the need to change the current DL CC to the lower DL CC, not transmit an indication of the lower DL CC for the CN node; or,
- based on the determination of the need to change the current DL CC to the lower DL CC, transmit an indication of the lower DL CC in an uplink transmission for the CN node.

11. A method in a wireless device configured to communicate with a Core Network (CN) node, the method comprising steps as follows:
- determining a current downlink (DL) coverage class (CC) needs to be changed to a higher DL CC or a lower DL CC; and,
- based on the determining of the need to change the current DL CC to the higher DL CC, transmitting an indication of the higher DL CC for the CN node by performing a cell update procedure,
- wherein the determining step and the transmitting step are performed at a predetermined time before a next occurrence of a nominal paging group.

12. The method of claim 11, wherein the step of transmitting the indication of the higher DL CC for the CN node by performing the cell update procedure further comprises using one of the following:
- a code point within an access request sent on a Random Access Channel (RACH) requesting uplink (UL) Transport Block Format (TBF) resources to send a cell update message;
- a reserved Service Access Point Identifier (SAPI) value in a header of a Logical Link Control (LLC) Protocol Data Unit (PDU) that serves as the cell update message;
- information carried within a Radio Link Control (RLC) data block which conveys at least a portion of a LLC PDU using assigned UL TBF resources; and,
- information carried within a RLC/Media Access Control (MAC) header of the RLC data block which conveys at least a portion of the LLC PDU using the assigned UL TBF resources.

13. The method of claim 11, further comprising a step of:
- based on the determining of the need to change the current DL CC to the lower DL CC, not transmitting an indication of the lower DL CC for the CN node.

14. The method of claim 11, further comprising a step of:
- based on the determining of the need to change the current DL CC to the lower DL CC, transmitting an indication of the lower DL CC in an uplink transmission for the CN node, wherein the uplink transmission has another purpose in addition to indicating the lower DL CC for the CN node.

15. The method of claim 14, wherein the step of transmitting the indication of the lower DL CC in the uplink transmission for the CN node further comprises a step of using one of the following:
- a code point within an access request sent on a Random Access Channel (RACH) requesting uplink (UL) Transport Block Format (TBF) resources to send the uplink transmission;
- a reserved Service Access Point Identifier (SAPI) value in a header of a Logical Link Control (LLC) Protocol Data Unit (PDU) that serves as the uplink transmission;
- information carried within a Radio Link Control (RLC) data block which conveys at least a portion of a LLC PDU using assigned UL TBF resources; and,
- information carried within a RLC/Media Access Control (MAC) header of the RLC data block which conveys at least a portion of the LLC PDU using the assigned UL TBF resources.

16. The method of claim 11, wherein the higher DL CC indicates at least one more blind repetition is needed than provided by the current DL CC, and wherein the lower DL CC indicates at least one less blind repetition is needed than provided by the current DL CC.

17. The method of claim 16, wherein the determining step further comprises determining based on radio conditions the current DL CC needs to be changed to the higher DL CC or the lower DL CC.

18. The method of claim 11, further comprising a step of: configuring a nominal paging group for a lowest CC within an extended Discontinuous Receive (eDRX) cycle associated with the wireless device to correlate with an additional nominal paging group associated with a higher CC within the eDRX cycle.

19. The method of claim 18, wherein the configuring step further comprises: using a benchmark paging block associated with the lowest CC to identify the nominal paging group for the lowest CC and the additional nominal paging group such that the additional nominal paging group associated with the higher CC has a set of paging blocks comprising the benchmark paging block.

20. The method of claim 11, further comprising a step of:
- based on the determining of the need to change the current DL CC to the lower DL CC, not transmitting an indication of the lower DL CC for the CN node; or,
- based on the determining of the need to change the current DL CC to the lower DL CC, transmitting an indication of the lower DL CC in an uplink transmission for the CN node.

21. A wireless device configured to communicate with a Core Network (CN) node, the wireless device comprising:
- a processor; and,
- a memory that stores processor-executable instructions, wherein the processor interfaces with the memory to execute the processor-executable instructions to perform operations to:
  - determine a current downlink (DL) coverage class (CC) needs to be changed to a higher DL CC;
  - transmit an indication of the higher DL CC for the CN node by performing a cell update procedure; and,
  - wherein the determine operation and the transmit operation are performed at a predetermined time before a next occurrence of a nominal paging group.

22. A method in a wireless device configured to communicate with a Core Network (CN) node, the method comprising steps as follows:
- determining a current downlink (DL) coverage class (CC) needs to be changed to a higher DL CC;
- transmitting an indication of the higher DL CC for the CN node by performing a cell update procedure; and,
- wherein the determining step and the transmitting step are performed at a predetermined time before a next occurrence of a nominal paging group.

* * * * *